(12) United States Patent
Grimm et al.

(10) Patent No.: US 11,427,238 B2
(45) Date of Patent: Aug. 30, 2022

(54) METHOD AND SYSTEM FOR VEHICLE DATA COMMUNICATION

(71) Applicant: Westinghouse Air Brake Technologies Corporation, Wilmerding, PA (US)

(72) Inventors: Ann K. Grimm, Cedar Rapids, IA (US); Rebecca W. Dreasher, Longmont, CO (US)

(73) Assignee: WESTINGHOUSE AIR BRAKE TECHNOLOGIES CORPORATION, Wilmerding, PA (US)

( * ) Notice: Subject to any disclaimer, the term of this patent is extended or adjusted under 35 U.S.C. 154(b) by 624 days.

(21) Appl. No.: 16/448,253

(22) Filed: Jun. 21, 2019

(65) Prior Publication Data

US 2019/0389498 A1   Dec. 26, 2019

Related U.S. Application Data

(60) Provisional application No. 62/688,205, filed on Jun. 21, 2018.

(51) Int. Cl.

| | |
|---|---|
| *B61L 27/16* | (2022.01) |
| *H04L 43/103* | (2022.01) |
| *B61L 25/02* | (2006.01) |
| *G01C 21/00* | (2006.01) |
| *H04L 67/12* | (2022.01) |
| *G06F 16/23* | (2019.01) |
| *B61L 27/30* | (2022.01) |

(Continued)

(52) U.S. Cl.
CPC .............. *B61L 27/16* (2022.01); *B61L 25/02* (2013.01); *B61L 27/30* (2022.01); *B61L 27/40* (2022.01); *B61L 27/70* (2022.01); *G01C 21/005* (2013.01); *G06F 16/2365* (2019.01); *H04L 43/103* (2013.01); *H04L 67/12* (2013.01)

(58) Field of Classification Search
CPC .......... B61L 27/16; B61L 27/40; B61L 27/70; B61L 27/30; B61L 25/02; G06F 16/2365; G01C 21/005; H04L 43/103; H04L 67/12
USPC ........................................................ 701/411
See application file for complete search history.

(56) References Cited

U.S. PATENT DOCUMENTS

| | | | |
|---|---|---|---|
| 2007/0016369 A1* | 1/2007 | Ishikawa ................ | G01C 21/00 701/408 |
| 2016/0203422 A1* | 7/2016 | Demarchi ............... | G06F 16/29 705/6 |

FOREIGN PATENT DOCUMENTS

| | | |
|---|---|---|
| WO | 2006097788 A1 | 9/2006 |
| WO | 2016203298 A1 | 12/2016 |

OTHER PUBLICATIONS

Office Action dated Jun. 14, 2022 for corresponding application No. MX/a/2019/007340. English translation provided.

* cited by examiner

*Primary Examiner* — Gertrude Arthur Jeanglaude
(74) *Attorney, Agent, or Firm* — Christopher R. Carroll; The Small Patent Law Group LLC

(57) ABSTRACT

A system, method, and computer program product for determining ancillary subdivision/districts may include obtaining route data associated with one or more vehicle network operators operating one or more subdivisions/districts over which the vehicle group may travel, determining an ancillary subdivision/district of the one or more subdivisions/districts that are not included in the route data by any of the one or more vehicle network operators, receiving route data for the vehicle network operator associated with the ancil- (Continued)

lary subdivision/district, and communicating with one or more wayside interface units in the ancillary subdivision/district based on the route data.

20 Claims, 12 Drawing Sheets

(51) Int. Cl.
*B61L 27/40* (2022.01)
*B61L 27/70* (2022.01)

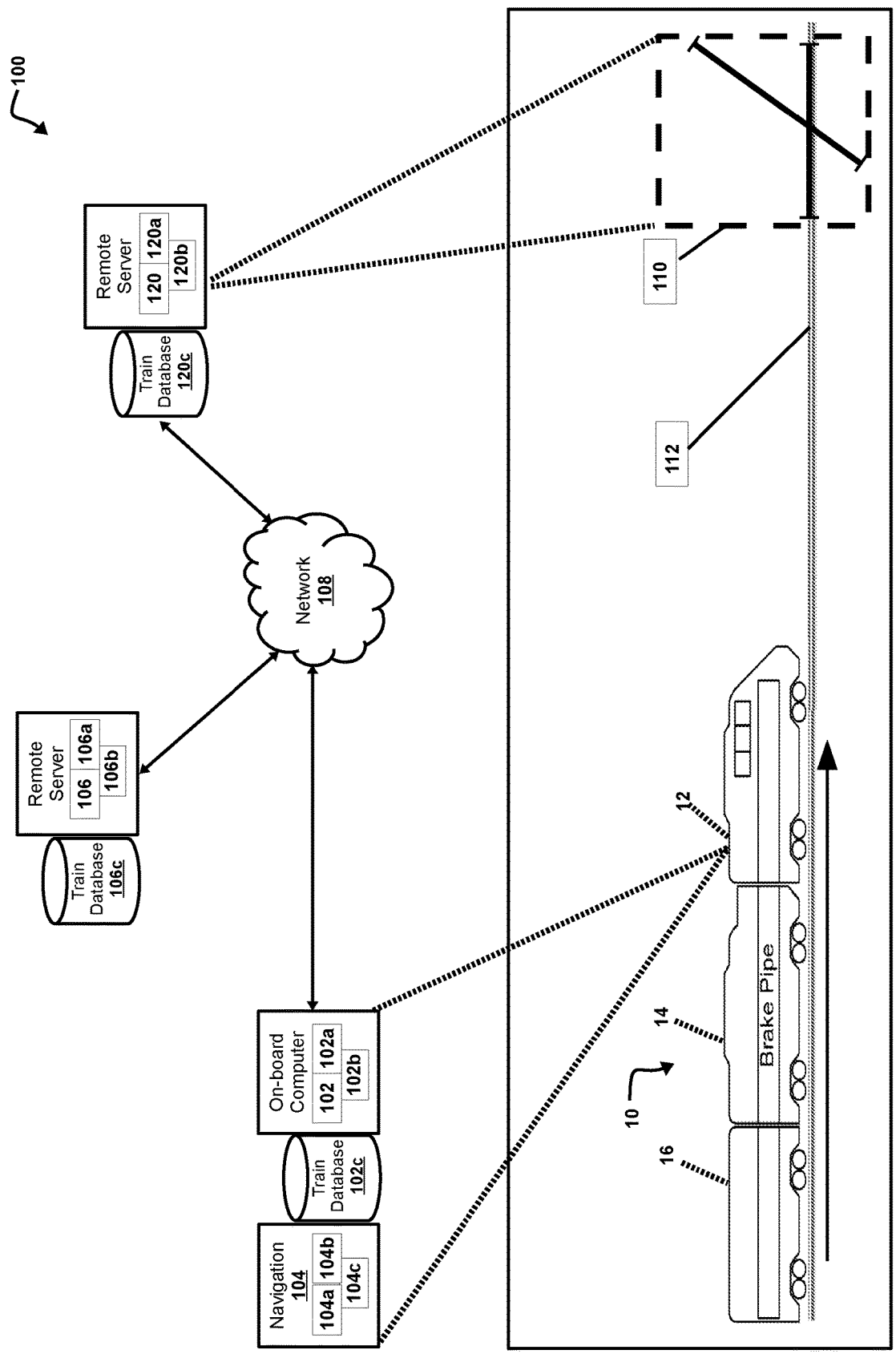

METHOD AND SYSTEM FOR VEHICLE DATA COMMUNICATION

CROSS REFERENCE TO RELATED APPLICATION

This application claims the benefit of U.S. Provisional Application No. 62/688,205, filed Jun. 21, 2018, the entire disclosure of which is incorporated herein by reference.

BACKGROUND

Technical Field

Disclosed embodiments relate to vehicle control systems and networks for providing data vehicle group and information.

Discussion of Art

The movement of one or more vehicle groups along a route can be governed in a variety of ways. An operating authority of a vehicle network operator may operate one or more of the vehicle groups through vehicle networks that exist throughout the world, and at any point in time. The vehicle groups may include different types of vehicles or may include just one type of vehicle. Suitable vehicles may be selected from cars, trucks, buses, locomotives, rail cars, mining and construction equipment, marine vessels, aircraft, agricultural vehicles, and the like, that are travelling throughout the route systems and vehicle networks. With reference to vehicle groups travelling along a route, such vehicle groups may be equipped with, or operated by, vehicle control systems (e.g., communication-based vehicle control and management systems). Such a group of vehicles may be referred to as, for example, a consist or train in a railroad implementation. These consists or trains may be mechanically and/or logically coupled together. Logical coupling includes communicatively coupling vehicles that do not move independently of each other, but rather move relative to each other. For example, vehicles that are logically coupled may remain separate from each other, but may communicate during movements of the vehicles so that the separate but logically coupled vehicles coordinate the movements with each other to move along routes as a vehicle group.

Vehicle control systems responsible for conducting rail traffic in the United States are regulated by the Federal Railroad Administration. For example, vehicle control systems, in addition to maintaining speed control, provide route data for operating a train while traversing a route. In an example, during initialization, the vehicle group's crew selects the vehicle network operators over which the vehicle group may operate on a particular route. Alternatively, while traversing a route, a change may occur in a subdivision or district requiring a change, which would be communicated via an update. An off-board system under the control of a vehicle network operator may be referred to as a back-office. The back-office may provide a list of vehicle group identifications or identities (IDs). The crew selects a vehicle group ID that applies to the vehicle group of the crew for an operating vehicle network operator, including one for each operating vehicle network operator. A back-office system then provides a list of subdivisions or districts based on the vehicle group ID's that are selected. After receiving the list of subdivisions or districts, a vehicle group may obtain correct route data. To determine a true or correct version of the route data, the vehicle group communicates with the one or more vehicle network operators operating the one or more subdivisions or districts of the route network over which the vehicle group is expected to travel. The vehicle control system determines the correct version of route data by matching each subdivision or district with a received version, and any mandatory directives that apply are matched to a respective subdivision or district. It may be desirable to have a method and system that differs from those that are currently available.

SUMMARY

In some non-limiting embodiments or aspects, dynamic vehicle control systems, computer-implemented methods, and computer program products are provided for retrieval of data required by vehicle groups for identifying route networks and operating within interlocked (e.g., intersecting, etc.) subdivisions/districts.

A system is provided that includes a controller disposed onboard a vehicle. The controller is configured to obtain route data associated with one or more subdivision or districts through or over which the vehicle will travel, and each subdivision or district having a corresponding vehicle network operator. The controller also is configured to determine what ancillary route data is needed for an ancillary subdivision or district through or over which the vehicle will travel. The controller also is configured to receive, at the vehicle, the ancillary route data associated with the ancillary subdivision or district.

A method is provided that includes obtaining route data associated with one or more subdivision or districts through or over which a vehicle will travel, with each subdivision or district having a corresponding vehicle network operator. If a determination is made that that ancillary route data is needed for an ancillary subdivision or district through or over which the vehicle will travel, the ancillary route data associated with the ancillary subdivision or district is received at the vehicle (e.g., by a controller onboard the vehicle).

A system for use in a rail operation is provided. The system includes a controller that is disposed onboard a locomotive, and the locomotive is coupled together with railcars to form a train. The controller is configured to obtain route data associated with a subdivision or district of a railroad network of tracks through or over which the locomotive will travel. The subdivision or district of the railroad network has a corresponding first railroad operator with a corresponding back office, wayside device protocol, and bulletin system. The controller is configured to determine, responsive to a change in a trip plan for the train, that the train will pass through an ancillary subdivision or district, that ancillary route data is needed for the ancillary subdivision or district through or over which the train will travel, and that the ancillary route data is not available the controller in ready memory (e.g., memory onboard the locomotive or off-board memory that is accessible by the controller before the locomotive reaches the ancillary subdivision or district). The controller then receives, in ready memory at the controller on the locomotive, the ancillary route data associated with the ancillary subdivision or district from an ancillary railroad operator that is different from the first railroad operator.

A computing system is provided that includes one or more processors that can obtain route data associated with one or more vehicle network operators operating one or more subdivisions/districts over which a vehicle group may travel, determine an ancillary subdivision/district of the one or more subdivisions/districts that is not included in the route data from any of the one or more vehicle network operators initialized with the onboard computer, receive the route data for the vehicle network operator associated with the ancillary subdivision/district, and communicate with one or more wayside interface units in the ancillary subdivision/district based on the route data.

A method is provided that includes obtaining (by an onboard computer of a vehicle group) route data associated with one or more vehicle network operators operating one or more subdivisions over which the vehicle group may travel, determining (by the onboard computer) an ancillary subdivision/district of the one or more subdivisions that is not included in the route data by any of the one or more vehicle network operators, receiving (by the onboard computer) the route data for the vehicle network operator associated with the ancillary subdivision/district, and communicating with one or more wayside interface units in the ancillary subdivision/district based on the route data.

A computer program product is provided including at least one tangible and non-transitory computer-readable medium including one or more instructions that, when executed by at least one processor, cause the at least one processor to obtain route data associated with one or more vehicle network operators operating one or more subdivisions over which a vehicle group may travel, determine an ancillary subdivision/district of the one or more subdivisions that is not included in the route data by any of the one or more vehicle network operators, receive the route data for the vehicle network operator associated with the ancillary subdivision/district, and communicate with one or more wayside interface units in the ancillary subdivision/district based on the route data.

A computer-implemented method may include obtaining (by an onboard computer of a vehicle group) route data associated with one or more vehicle network operators operating one or more subdivisions over which the vehicle group may travel, determining (by the onboard computer) an ancillary subdivision of the one or more subdivisions that is not included in the route data by any of the one or more vehicle network operators, receiving (by the onboard computer) the route data for the vehicle network operator associated with the ancillary subdivision, and communicating with one or more wayside interface units in the ancillary subdivision based on the route data.

The ancillary subdivision may be determined by determining at least one subdivision having at least one route segment intersecting one or more subdivisions, where the at least one subdivision determined to be the ancillary subdivision is not operated by the one or more vehicle network operators that are operating the one or more subdivisions. The at least one subdivision determined to be the ancillary subdivision can include the at least one route segment intersecting the one or more subdivisions, or one or more wayside interface units of the at least one subdivision operating within the at least one route segment.

A polling request may be registered for a back-office computer of the vehicle network operator associated with the ancillary subdivision. The polling request can include a vehicle group identifier. The onboard computer can receive a confirmation of poll registration from the back-office computer, receive poll messages including a hash over a list of mandatory directive identifiers and a route data version, and validate the route data.

A suitable vehicle group identifier may include a locomotive identifier, a vehicle group identifier established during initialization, or a vehicle group identifier assigned by the back-office computer responding to the polling request.

The poll messages may be received periodically. The poll messages comprise an identifier of at least one of a form-based authority, a bulletin, a speed restriction, or a null list of mandatory directive identifiers. The polling request may be resent for the route data within a threshold amount of time. If the ancillary subdivision is deregistered, the ancillary subdivision may be removed from a list of one or more subdivisions.

The onboard computer may generate a request for the route data for the vehicle network operator associated with the ancillary subdivision. The onboard computer also can receive a response including a route data version for the ancillary subdivision, validate the response, obtain the route data associated with the route data version, and update the onboard computer with a portion of the route data associated with the ancillary subdivision.

The route data may be obtained by associating the route data version with the ancillary subdivision. This may be done by determining whether the route data is stored locally. In response to determining that the route data is not stored locally, a request for the route data can be sent from the onboard computer to a back-office computer of the vehicle network operator associated with the ancillary subdivision. The onboard computer can receive the route data for the ancillary subdivision from the back-office computer of the vehicle network operator associated with the ancillary subdivision and can validate the route data based on the request.

A local device may receive a status table to decode a device status code associated with a wayside device in the ancillary subdivision.

Separately from the route data, a security key associated with the wayside interface unit may be stored in the ancillary subdivision. The security key can be obtained to decrypt a message received from the wayside interface unit based on a device status of a wayside device in the ancillary subdivision.

The route data that is received may be used to update the onboard computer with a portion of the route data for at least one vehicle network operator of the one or more vehicle network operators. The route data includes intersecting subdivision identifiers associated with the route data of the at least one vehicle network operator having at least one route segment intersecting the one or more subdivisions.

The vehicle network operator associated with the ancillary subdivision can determine that a vehicle group identifier associated with the vehicle group is not in one or more vehicle group identifiers of the vehicle network operator associated with one or more respective vehicle groups. The vehicle network operator can generate and send the vehicle group identifier associated with the vehicle group, and the vehicle group can register a polling request for the ancillary subdivision based on the vehicle group identifier.

The route data that is obtained may be used in initialization of the onboard computer by providing information including employee credentials and the one or more vehicle network operators over which the vehicle group is expected to travel and by receiving, from a back-office computer, at least one of a list of subdivisions the vehicle group is expected to operate over.

A system is provided that may include one or more processors programmed and/or configured to obtain route data associated with one or more vehicle network operators operating one or more subdivisions over which a vehicle group may travel, determine an ancillary subdivision of the one or more subdivisions that is not included in the route data by any of the one or more vehicle network operators, receive the route data for the vehicle network operator associated with the ancillary subdivision, and communicate with one or more wayside interface units in the ancillary subdivision based on the route data.

The one or more processors may identify the ancillary subdivision by determining whether at least one subdivision has at least one route segment intersecting the one or more other subdivisions and this at least one subdivision is not operated by the one or more vehicle network operators operating the other subdivisions. Each subdivision includes at least one route segment of the at least one subdivision, or the one or more wayside interface units of the at least one subdivision operating within the at least one route segment.

The controller may register a polling request for a back-office computer of the vehicle network operator associated with the ancillary subdivision. The polling request includes a vehicle group identifier. The controller can receive a confirmation of poll registration from the back-office computer, receive poll messages including a hash over a list of mandatory directive identifiers and a route data version, and validate the route data.

The vehicle group identifier may include a locomotive identifier, a vehicle group identifier established during initialization, or a vehicle group identifier assigned by the back-office computer responding to the polling request.

Poll messages may be received periodically. The poll messages include an identifier of at least one of a form-based authority, a bulletin, a speed restriction, or a null list of mandatory directive identifiers.

The controller may deregister if the ancillary subdivision is removed from a list of one or more subdivisions.

The controller may resend the polling request for the route data within a threshold amount of time.

The controller may request for the route data for the vehicle network operator associated with the ancillary subdivision, receive a response including a route data version for the ancillary subdivision, validate the response, obtain (by the onboard computer) the route data associated with the route data version, and update the onboard computer with a portion of the route data associated with the ancillary subdivision.

The controller may obtain the route data associated with the route data version by determining whether the route data is stored locally, sending the request for the route data to a back-office computer of the vehicle network operator associated with the ancillary subdivision responsive to determining the route data is not stored locally, receiving the route data for the ancillary subdivision from the back-office computer of the vehicle network operator associated with the ancillary subdivision; and validating the route data based on the request.

The controller may receive a local device status table to decode a device status code associated with a wayside device in the ancillary subdivision.

The controller may store a security key associated with the wayside interface unit in the ancillary subdivision, and may decrypt a message received from the wayside interface unit based on a device status of a wayside device in the ancillary subdivision using the security key. The security key may be stored separately.

The controller may receive the route data by updating the onboard computer with a portion of the route data for at least one vehicle network operator of the one or more vehicle network operators. The route data includes intersecting subdivision identifiers associated with the route data of the at least one vehicle network operator having at least one route segment intersecting the one or more subdivisions.

The vehicle network operator associated with the ancillary subdivision may determine a vehicle group identifier associated with the vehicle group is not in one or more vehicle group identifiers of the vehicle network operator associated with one or more respective vehicle groups. The vehicle network operator generates and sends the vehicle group identifier associated with the vehicle group. The vehicle group may register a polling request for the ancillary subdivision based on the vehicle group identifier.

The controller may obtain the route data by initializing the onboard computer by providing information including employee credentials and the one or more vehicle network operators over which the vehicle group is expected to travel. The controller may receive, from a back-office computer, at least one of a list of subdivisions that the vehicle group is expected to operate over.

The controller may obtain route data associated with one or more vehicle network operators operating one or more subdivisions over which a vehicle group may travel, determine an ancillary subdivision of the one or more subdivisions that is not included in the route data by any of the one or more vehicle network operators, receive the route data for the vehicle network operator associated with the ancillary subdivision, and communicate with one or more wayside interface units in the ancillary subdivision based on the route data.

The ancillary subdivision may be identified as a subdivision having at least one route segment intersecting the one or more other subdivisions but that is not operated by the same vehicle network operators. The ancillary subdivision may include the route segment of the subdivision, or a wayside interface units of the ancillary subdivision operating within the at least one route segment.

One or more instructions further cause at least one processor to register a polling request for a back-office computer of the vehicle network operator associated with the ancillary subdivision. The polling request includes a vehicle group identifier. The instructions can cause the at least one processor to receive a confirmation of poll registration from the back-office computer, receive poll messages including a hash over a list of mandatory directive identifiers and a route data version, and validate the route data.

The vehicle group identifier comprises a locomotive identifier, a vehicle group identifier established during initialization, or a vehicle group identifier assigned by the back-office computer responding to the polling request.

The poll messages can be received periodically. The poll messages can include an identifier of at least one of a form-based authority, a bulletin, a speed restriction, or a null list of mandatory directive identifiers.

The one or more instructions further cause the at least one processor to: deregister if the ancillary subdivision is removed from a list of one or more subdivisions. The one or more instructions further cause the at least one processor to resend the polling request for the route data within a threshold amount of time.

The one or more instructions further cause the at least one processor to generate (by the onboard computer) a request for the route data for the vehicle network operator associated with the ancillary subdivision, receive a response including a route data version for the ancillary subdivision, validate the response, obtain (by the onboard computer) the route data associated with the route data version, and update the onboard computer with a portion of the route data associated with the ancillary subdivision.

The one or more instructions further cause the at least one processor to obtain the route data associated with the route data version by determining whether the route data is stored locally and, in response to determining the route data is not stored locally, send the request for the route data to a back-office computer of the vehicle network operator associated with the ancillary subdivision. The one or more instructions also may cause the at least one processor to receive the route data for the ancillary subdivision from the back-office computer of the vehicle network operator associated with the ancillary subdivision and validate the route data based on the request.

The one or more instructions further cause the at least one processor to receive a local device status table to decode a device status code associated with a wayside device in the ancillary subdivision.

The one or more instructions further cause the at least one processor to store, separately from the route data, a security key associated with the wayside interface unit in the ancillary subdivision and decrypt a message received from the wayside interface unit based on a device status of a wayside device in the ancillary subdivision using the security key.

The one or more instructions further cause the at least one processor to receive the route data by updating the onboard computer with a portion of the route data for at least one vehicle network operator of the one or more vehicle network operators. The route data can include intersecting subdivision identifiers associated with the route data of the at least one vehicle network operator having at least one route segment intersecting the one or more subdivisions.

A vehicle network operator of the one or more vehicle network operators associated with the ancillary subdivision determines a vehicle group identifier associated with the vehicle group is not in one or more vehicle group identifiers of the vehicle network operator associated with one or more respective vehicle groups. The vehicle network operator generates and sends the vehicle group identifier associated with the vehicle group. The vehicle group registers a polling request for the ancillary subdivision based on the vehicle group identifier.

The one or more instructions further cause the at least one processor to obtain the route data by initializing the onboard computer by providing information including employee credentials and the one or more vehicle network operators over which the vehicle group is expected to travel and receiving, from a back-office computer, at least one of a list of subdivisions the vehicle group is expected to operate over.

These and other features and characteristics of the embodiments are shown in this specification, as well as the methods of operation and functions of the related elements of structures and the combination of parts and economies of manufacture. Like reference numerals designate corresponding parts in the various figures. The drawings are for the purpose of illustration and description only.

BRIEF DESCRIPTION OF THE DRAWINGS

FIG. 1 is a diagram of a non-limiting embodiment or aspect of a vehicle communication and/or control system in which systems, devices, products, apparatuses, and/or methods, described herein, can be implemented;

DETAILED DESCRIPTION

Figure 2B:
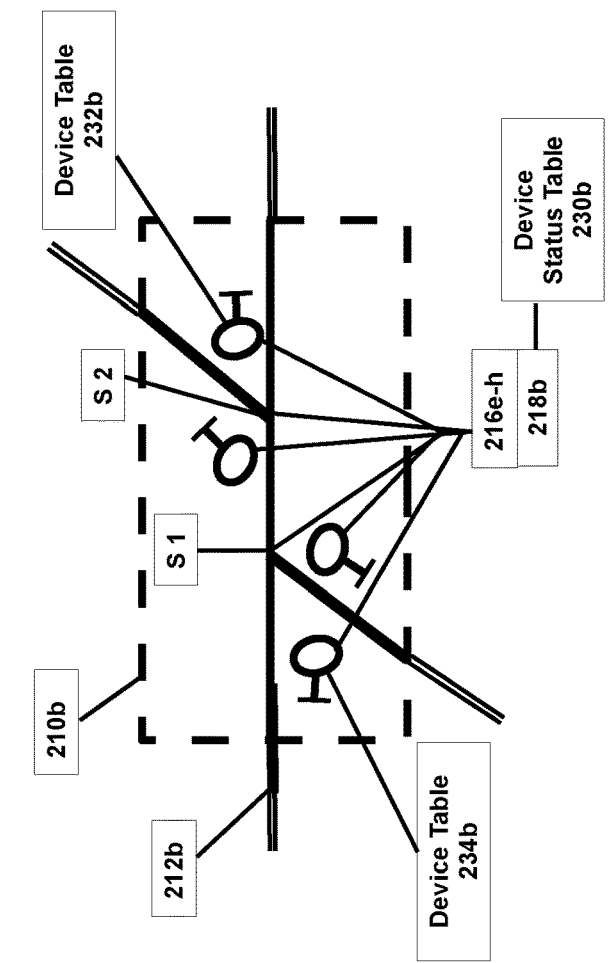
FIGS. 2A and 2B are diagrams of ancillary subdivision/districts of an implementation of one or more processes as disclosed herein.

Vehicle control systems and networks for providing data vehicle group and information are disclosed herein. In one embodiment, a system and method are provided. The system may include a controller onboard a vehicle. The controller may obtain route data associated with one or more subdivision or districts through or over which the vehicle will travel. Each subdivision or district has a corresponding vehicle network operator. The controller may determine that ancillary route data is needed for an ancillary subdivision/district through or over which the vehicle will travel. The controller may then receive, at the vehicle, the ancillary route data associated with the ancillary subdivision/district.

The need for ancillary route data may be necessitated by a change to a trip plan once a vehicle group is in route. In such a case, the vehicle in the vehicle group may not have the route data needed to traverse the ancillary subdivision/district. Without this information, the vehicle group may not be able to communicate with the wayside devices to get the ancillary route data as the vehicle group may not have information on the communication protocols in use in the ancillary subdivision/district. The vehicle group may not have information with regard to the status or location of obstacles on the route in the ancillary subdivision/district, and the vehicle group may not have communicated to an ancillary vehicle network operator the intended route or the associated timing of the vehicle group. Accordingly, a controller or onboard computer with the vehicle group may obtain the ancillary route data, notify the ancillary vehicle network operator, and receive updates regarding the ancillary subdivision/district according to embodiments of the inventive subject matter described herein.

A trip plan can be planned or expected movements of a vehicle or vehicle group over one or more routes to a location. For example, a trip plan can define, designate, or dictate operational settings or goals by which the vehicle or vehicle group is to be controlled to achieve at different locations, distances, times, or the like, during the upcoming trip or portion of the upcoming trip. Examples of these operational settings or goals can include throttle settings, brake settings, speeds, accelerations, audible noise, etc. The trip plan can be used by the controller to automatically or autonomously control movement of the vehicle or vehicle group or optionally to notify an onboard operator on how to control the vehicle or vehicle group to travel according to the trip plan. A trip plan also can be referred to as a route plan.

As used herein, route data may include the basic nature of the route (e.g., road, track, path, air corridor), the grade of the route (i.e., the slope or rate of change, the elevation of the route (which may be used to calculate, e.g., ambient air pressure or intersections with other routes), route curvature(s) (the existence of curvature in routes, whether the curvature is a curve to the right, left, or in a complex or undulating way), state of health, nearby amenities, fueling opportunities, intersections, sidings, ingress/egress points, operational limits, and the like. The subdivisions/districts may be static or dynamic but are geofenced locations that correspond to defined areas (or volumes) of space. A correct route data version may be obtained or provided by a vehicle network operator for any subdivision/district included in an upcoming route plan. A trip plan or a route plan includes the navigation and operation information needed for a vehicle or vehicle group to traverse at least a portion of the route in a subdivision/district. Vehicle identifiers, and vehicle group identifiers are identifiers associated with particular equipment or vehicles. A vehicle group having a vehicle group identifier may include a plurality of vehicles (each of which may have a vehicle identifier). As used herein, the term "vehicle control system" may refer to a digital data link communications networks, continuous and accurate positioning systems, such as global positioning systems (GPS), onboard computers with digitized maps, controllers, and displays. A common thread for vehicle control systems is that the control systems control operational aspects of vehicles. In an example, vehicle control systems may interface with tactical and strategic traffic planners, work order reporting systems, and vehicle health reporting systems. In another example, the vehicle control system is an energy management system that controls operation and optimization of the vehicle group as a whole, as well as the individual vehicles that make up the vehicle group. Such an energy management system may create or modify trip plans so that the vehicle or vehicle group consumes less fuel, generates fewer emissions, reduces forces exerted on components of the vehicle or vehicle group, and/or reduces wear and tear on components of the vehicle or vehicle group (relative to the vehicle or vehicle group traveling according to other settings or goals not defined by the trip plan, such as upper speed limits of the routes being traveled upon).

Suitable vehicles may be selected from cars, trucks, buses, locomotives, rail cars, mining and construction equipment, marine vessels, aircraft, agricultural vehicles, and the like, that are travelling throughout the route systems and vehicle networks. As the vehicle groups are intended to move together for at least some portion of the route, the vehicle network operator may treat a vehicle group as a point, from time to time, and may account for the different volume of space that a vehicle group occupies relative to a single vehicle. Optionally, a vehicle group can be formed from a single group. The vehicle group may be operated by the controller in one or more different modes. These modes may include normal operation, but may also include operation at a reduced speed, may rely on onboard vehicle sensors and control systems to navigate, may operate in a fuel efficiency mode, or may operate in low-emissions (noise or exhaust) mode. Other modes of operation may include high torque, high speed, high adhesion, low wear, and a limp-home mode if one or more components are distressed but the vehicle is still mobile.

The onboard computer may register with back-office servers for the ancillary subdivision/district and may request a vehicle group ID for use in the ancillary subdivision/district or may register for polling or updates to the ancillary route data should an update become available. If the ancillary subdivision/district is associated with a second vehicle network operator that operates a separate remote server, the onboard computer may obtain and store ancillary route data. Further, the onboard computer may notify the second vehicle network operator with information that may include one or more of the vehicle ID, the vehicle group ID, the number and/or size and/or type of vehicles, the cargo onboard the vehicle, the trip plan for the vehicle (including the route data), the anticipated time of arrival of the vehicle in the ancillary subdivision/district, the anticipated time of departure of the vehicle from the ancillary subdivision/district, and the like.

The use of the term "mandatory" may be industry jargon but is used here to differentiate from vehicle-level decisioning. Suitable vehicle control systems may issue mandatory directives to a vehicle or to a vehicle group, and to maintenance-of-way crews. These mandatory directives may include, for example, a movement authority, a speed restriction, or another operational parameter for the vehicle or the vehicle group to follow. The vehicle control system may select a route or location for the vehicle or the vehicle group, and for maintenance-of-way vehicles, may issue enforce movement authorities, and may update related data systems with information on the location, speed and direction of the vehicle and/or vehicle group. A vehicle control system may stop a first vehicle group should another (e.g., second) vehicle or vehicle group intercept the path of the first vehicle group, if a vehicle in the vehicle group suffers a failure, if the route ahead is impaired or occupied, if a member of the vehicle group becomes incapacitated, etc. Vehicle control systems may provide a vehicle network operator with data and/or obtain data to run scheduled operations and running time, control asset utilization, and administer route management, capacity, and/or the like.

As used herein, the term "ancillary" may refer to an adjacency or adjacent item. For a division, subdivision, roadway, vehicle network operator, route segment, and/or the like, an ancillary version exists as a piece that is adjacent or interlocked thereto. The route data associated with the ancillary subdivision/district may be a different file, database, or other logical representation that includes route segment and wayside interface unit information needed by the vehicle controller to traverse a vehicle's next route portion (as the vehicle transitions from the current geofence area to the ancillary geofence area). By way of analogy, a cross country trip may take a traveler through multiple regions, each with a corresponding map. As the traveler progresses along the trip (through his route) the traveler may switch from map to map using the one that is current for the current location along the route. Maps of upcoming areas to which the traveler is headed and/or maps of areas into which the traveler heads that deviate from a previously planned route may be ancillary areas, divisions, subdivisions, etc.

As used herein, the term "vehicle group subdivision/district list" may refer to geographically defined region, e.g., divisions, subdivisions, or districts, through or over which the vehicle group currently intends or is planned to operate within as compiled from the vehicle group subdivision/ district messages received from the operating vehicle network operators that are selected at initialization. This is a portion of the route in which the vehicle currently resides.

As used herein, the term "ancillary subdivision/district list" may refer to the one or more adjacent, subordinate or ancillary geographically defined regions, e.g., subdivision/districts, subdivisions, or districts, that may be useful or needed by a vehicle's onboard computer in order to traverse a future portion of a route. This ancillary subdivision/district list may include an identifier or link to each included ancillary subdivision/district. The ancillary subdivision/district list and vehicle group subdivision/district list may together provide the subdivision(s) and/or district(s) over which the vehicle or vehicle group may travel.

As used herein, the term "operator" may refer to person or a controller. If to a person, the operator may be an engineer, conductor, a vehicle network operator worker, or an employee of a vehicle network operator whose duties include operating a vehicle within a vehicle group. The operator may further be tasked with responding, communicating, or analyzing route data. The route data may include information regarding inspection, construction, maintenance or repair of the route, bridges, roadways, signal and communication systems, vehicle network operator facilities or railway maintenance machinery on, near, or with the potential of damaging (e.g., fouling) a route, and locations of flagmen, safety crew, and watchmen/lookouts. This partial list of route data is expanded elsewhere in this disclosure.

As used herein, the term "computing device" may refer to one or more electronic devices that are configured to directly or indirectly communicate with or over one or more networks. A computing device may be a mobile or portable computing device, a desktop computer, a server, and/or the like. Furthermore, the term "computer" may refer to any computing device that includes the necessary components to receive, process, and output data, and normally includes a display, a processor, a memory, an input device, and a network interface. A "computing system" may include one or more computing devices or computers. An "application" or "application program interface" (API) refers to computer code or other data sorted on a computer-readable medium that may be executed by a processor to facilitate the interaction between software components, such as a client-side front-end and/or server-side back-end for receiving data from the client. An "interface" refers to a generated display, such as one or more graphical user interfaces (GUI) with which a user may interact, either directly or indirectly (e.g., through a keyboard, mouse, touchscreen, etc.). Further, multiple computers, e.g., servers, or other computerized devices, such as an autonomous vehicle may include a vehicle computing system that, directly or indirectly, communicates with a network environment, may constitute a "system" or a "computing system". Collectively, the term "controller" is a broad term that includes all of the foregoing as either hardware or software, or the combination of the two and exists or is configured at least to execute commands.

The systems and/or methods described herein can be implemented in different forms of hardware, software, or a combination of hardware and software. The actual specialized control hardware or software code (see "controller" above) used to implement these systems and/or methods is not limiting of the implementations. Thus, the operation and behavior of the systems and/or methods are described herein without reference to specific software code. The software and hardware, i.e., the controller, can implement the systems and/or methods based on the description herein.

Some non-limiting embodiments or aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold. Accordingly, a threshold and the corresponding threshold value will be indicated in context.

Route data may exist for subdivisions/districts, and the route data may be updated from time to time. (e.g., an ancillary subdivision/district, etc.). Route data for a geographic area may be the responsibility of a vehicle network operator, or for a segment of a vehicle network operator's subdivision/district, whereas other vehicle network operators may have responsibility for the route data of other subdivisions/districts.

As disclosed herein, in some non-limiting embodiments or aspects, a system, a device, or method of vehicle group control may obtain route data from one or more vehicle network operators operating one or more subdivisions/districts over which the vehicle group may travel. But, if the route data for an ancillary subdivision/district (ancillary route data) is not included in the initial download, the system may request or receive the ancillary route data associated with the ancillary subdivision/district. Optionally, the system may communicate with one or more wayside interface units in the ancillary subdivision/district. The ancillary route data may be an additional request at the beginning of the route traversal (trip), or the ancillary route data may be acquired (or updated) during the trip. In this way, systems, devices, or methods of vehicle control may obtain accurate and sufficient ancillary route data. This route data, ancillary or otherwise, may be useful for determining mandatory directives and/or route segments for a subdivision/district in which the vehicle group finds itself. For example, if a vehicle finds itself in a subdivision/district that is previously unknown to be part of the projected trip plan (i.e., not initialized information), is unrecorded by an operator, or is part of a detour, a rerouting, or a shortcut—the vehicle may still correctly navigate through the unplanned or projected subdivision/district. For example, the systems, devices, or methods of vehicle group control may obtain and/or provide route data for vehicle network operators in any geographic areas including a vehicle network operator and/or a segment of vehicle network operator where a vehicle group may cross over a small segment of route belonging to another vehicle network operator (e.g., an interlocked route, an intersecting route, etc.) and/or a route (e.g., segment of route, intersecting route, etc.). Additionally and/or alternatively, systems, devices, or methods of vehicle group control may identify and obtain subdivisions/districts from a vehicle network operator, including those that may not be identified during initialization or in later provided updates, identify or communicate with devices located in and/or associated with a subdivision/district that has not been previously identified, and may determine ancillary route data for an ancillary subdivision/district. In one embodiment, systems, devices, or methods of vehicle group control may obtain mandatory directives and correct/current ancillary route data for activating wayside devices associated with the route plan that the vehicle group needs for traversing an ancillary subdivision/district. Additionally, systems, devices, or methods of vehicle group control may accurately and/or efficiently provide speed and operational instructions within an ancillary subdivision/district.

Referring now to FIG. 1, a diagram is provided of a vehicle control system 100 in which systems and/or methods, described herein, can be implemented. In the illustrated embodiment, the vehicle control system communicates with a vehicle group (a train 10) that includes multiple vehicles (a locomotive 12 and one or more railcars 14 and an end of vehicle group railcar 16). Rather than a locomotive and a train, alternative suitable vehicles and vehicle groups may include caravans of trucks or cars, swarms of drones, fleets of ships, and the like. Systems and/or devices of the vehicle control system can interconnect via wired connections, wireless connections, or a combination of wired and wireless connections.

In one embodiment, the vehicle control system and methods described herein may be implemented on, or in connection with, a controller or onboard computer 102 of at least one vehicle in the vehicle group. The controller may include a communication device 102a, a display interface 102b, and a vehicle group database 102c. For example, the onboard computer of a vehicle or multiple vehicles in the vehicle group may obtain route data associated from one or more vehicle network operators operating one or more subdivisions/districts over which the vehicle group will travel. The onboard computer may determine an ancillary subdivision/district's ancillary route data is not included in the route data included in the vehicle group subdivision/district list. The onboard computer may request and/or receive ancillary route data for the ancillary subdivision/district. During the trip, the onboard computer may communicate with one or more wayside systems (e.g., a wayside interface unit, wayside device, cell tower, satellite, and the like) or other offboard communication device to receive the ancillary route data. This may be done through a WIU (or equivalent) in the subdivision/district or in the ancillary subdivision/district.

In one embodiment, the onboard computer may be on a vehicle in the vehicle group. In one embodiment, the onboard computer (i.e., onboard controller, onboard vehicle control system, vehicle group management computer, and/or the like) performs the calculations for dynamic vehicle group control in a vehicle network operator (e.g., a railway, a route network, etc.).

In one embodiment, the onboard computer communicates with a vehicle control system (e.g., a comprehensive vehicle group control system that encompasses one or more vehicle network operators, one or more subdivisions, one or more districts, one or more route networks, and/or the like). As an example, onboard computer includes a communication device 102a (e.g., a data radio, etc.), which may be used to communicate between the onboard computer in one or more of the locomotives in consist to form a train, and a wayside system, (e.g., a wayside interface unit, wayside device, a switch monitor, etc.), a display unit 102b that may be provided in the vehicle to visually display information or data to an operator, a route database 102c that may include route data (e.g., a client data store having a copy of route data having vehicle network operator and/or vehicle group information and data, including route information, switch information, signal information, route heading changes (e.g., curves, etc.), distance measurements (e.g., distance measurements between route positions or locations, etc.), vehicle group information (e.g., the number of vehicles, the number of railcars, the number of conventional passenger cars, the total length of the vehicle group, etc.), vehicle identifiers, vehicle group control equipment identifiers (e.g., an onboard computer), and/or the like, a remote server 106 (e.g., a back-office server (BOS), a central controller, central dispatcher, etc.), that may include a communication device 106a (e.g., a data radio, etc.) and a display unit 106b that may be provided to visually display information or data.

In one embodiment, onboard computer may include a navigation system 104 (including one or more of a positioning system 104a (e.g., GPS, etc.), speed sensor 104b (e.g., a wheel tachometer, GPS, an odometer differentiated in time, etc.), an inertial sensor 104c (e.g., a rotational sensor, an accelerometer, a gyroscope, etc.) that is configured to measure the rate of the heading change for the vehicle, and by implication the vehicle group). In one embodiment, at least a portion of the route data, may be received by, populated, or stored in at least one central database 106c (e.g., a remote database, etc.) accessible by or through the remote server 106. Accordingly, the route data is accessible throughout and useful within the vehicle network operator by any connected or communicative vehicle (e.g., a locomotive, consist, etc.) of any travelling vehicle group (or other vehicle) for navigational or other purposes. In one embodiment, onboard computer includes an onboard control system. The onboard computer may perform onboard calculations of the vehicle control system for the vehicle group; determine a location of objects or obstructions on the route; determine an alternate course, detour or shortcut; switch operating modes of one or more vehicles in the vehicle group, and effectuate mandatory directives.

In one embodiment, the onboard computer may determine a route (e.g., a path, a route, a trip or trip plan, a traversal, corridor, etc.) of a vehicle or vehicle group to include travel not only through a subdivision/district but also through an ancillary subdivision/district 110. For example, as shown in FIG. 1, the vehicle group may traverse a subdivision/district 112 with a heading to or towards the ancillary subdivision/district. The onboard computer may determine that ancillary route data for the ancillary subdivision/district may not be included in a subdivision/district list for vehicle group, or information that the onboard computer has is not current, corrupted, or otherwise of suspect veracity. The onboard computer may determine a need to obtain and/or load ancillary route data associated with the ancillary subdivision/district, and then obtains or loads such ancillary route data. For example, the onboard computer moves a copy of the route data file from a mobile device manager (persistent storage, non-volatile storage, etc.) into active memory (e.g., volatile storage, etc.). In another example, onboard computer may request a vehicle group ID from remote server 120 of an ancillary vehicle network operator associated with the ancillary subdivision/district. The remote server may be communicatively coupled with a communication device 120a (e.g., a data radio, etc.) and a display unit 120b that may visually display information or data. In one embodiment, the vehicle group may not be capable of operating when crossing route segments or devices in the ancillary subdivision/district without the ancillary route data.

In one embodiment, a communication network 108 includes one or more wired and/or wireless networks. A suitable communication network may include a cellular network (e.g., a long-term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a satellite link, a private network, an ad hoc network, an intranet, the Internet, a fiber optic-based network, a cloud computing network, and/or the like, and/or a combination of these or other types of networks, such as electronic communication protocols and/or algorithms may be used including, for example, TCP/IP (including HTTP and other protocols), WLAN (including 802.11 and other radio frequency-based protocols and methods), analog transmissions, Global System for Mobile Communications (GSM), private wireless, public wireless, 160/220/900 MHz VHF, WiFi, UHF 452-458 MHz, WiMAX, omni-directional, and/or the like.

Figure 2A:
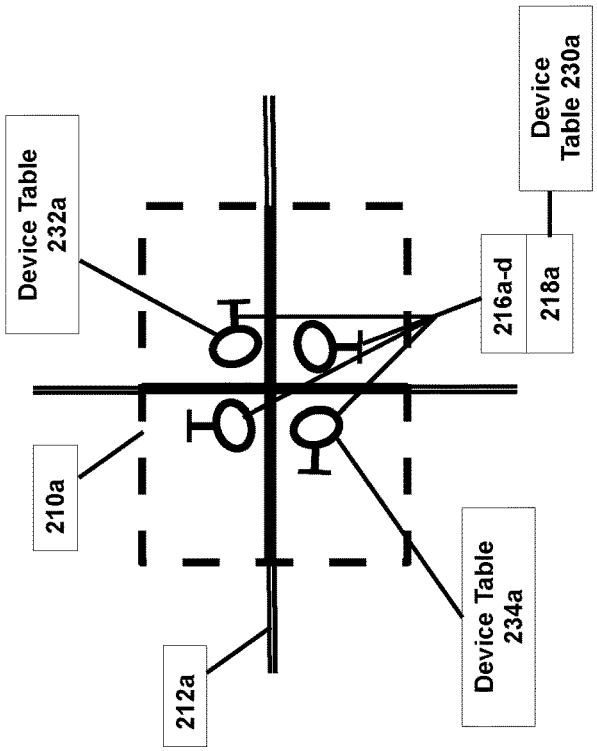

Referring now to FIGS. 2A and 2B, examples are shown for identifying an ancillary subdivision/district in which systems and/or methods, described herein, can be implemented. In some examples, subdivisions/districts 212a and 212b, as well as ancillary subdivisions/districts 210a and 210b of FIGS. 2A and 2B may correspond to subdivision/district 112 and ancillary subdivision/district 110 of FIG. 1. Characteristics that may cause a subdivision/district to be ancillary to another subdivision/district may include that an ancillary subdivision/district has a short portion or segment of a route that extends through another subdivision/district or may include a different type of wayside device with a different communication protocol as illustrated in FIGS. 2A and 2B.

The subdivision/district and ancillary subdivision/district may include interlocked route segments, wayside devices 216a-d, and wayside interface unit 218a. A subdivision/district 212b and ancillary subdivision/district 210b may include the interlocked route segments, wayside devices 216e-h, and wayside interface unit 218b, and switches S1 and S2. A vehicle group travelling on a route via a trip plan through a first subdivision/district may need information about a second, ancillary subdivision/district to pass over or through the interlocked route. The vehicle group may travel on the second ancillary subdivision/district without having any information about the first subdivision/district. The first subdivision/district is not ancillary to the second subdivision/district.

In one embodiment, a vehicle control system has one or more models running on remote server or an onboard computer may include data storage for ancillary subdivision/district characteristics. This long term data storage may be in a file format that identifies possible ancillary subdivision/districts for which the route data was created. The vehicle control system may include a data model for parsing the route data for linkages to other subdivision/districts. Thus, route data for the current trip plan is loaded to the onboard computer, while possibly useful ancillary information is loaded into the long term data storage. Because the ancillary data is stored in an easily identifiable manner, once particular ancillary information is identified as useful the corresponding ancillary data can be identified and loaded into memory of the onboard computer. Similarly, the communication information and protocols for communication between the onboard computer and the wayside devices, or ancillary wayside devices if the vehicle system is in the ancillary subdivision/district, may be used to either retrieve additional ancillary route data and/or check on the freshness (veracity and validity) of the ancillary route data already onboard the vehicle. Additionally, as the ancillary subdivision/district becomes the current subdivision/district for the location of the vehicle, due to a re-routing, for example, the onboard system may look ahead to additional ancillary subdivision/districts and begin the process for loading ancillary route data for those new subdivision/districts on the revised trip plan.

The onboard computer may retrieve route segment information from the ancillary route data for the ancillary subdivision/district when the route segment is embedded within a subdivision/district in the vehicle group subdivision/district list. An entry in the ancillary subdivision/district table may be needed where the route of an ancillary subdivision/district is interlocked within (e.g., intersecting, embedded, etc.) a subdivision/district in the vehicle group subdivision/district list.

The onboard computer may retrieve or process information on wayside devices that control some aspect of movement of a vehicle over one or more interlocked route segment(s). A first device table 230a may be associated with a wayside interface unit 218a, a second device table 232a may be associated with a first set of wayside devices 216a-d, and a third device table 234a may be associated with a second set of wayside devices 216a-d. A fourth device table 230b may be associated with a second wayside interface unit 218b, a fifth device table 232b may be associated with a third set wayside devices 216e-h, and a sixth device table 234b may be associated with a fourth set of wayside devices 216e-h.

The onboard computer may store, determine, and/or communicate a status identifier, selected from a plurality of status identifiers in a device table of an ancillary subdivision, to provide a common enforcement group for both intersecting vehicle network operators of an interlocking roadway, railway or vehicle network. In such an example, a signal group for translating (e.g., mapping, decoding, etc.) a status of a signal, may include indicators of vehicle group control actions for signals (or combinations of signals) such as, stop required, restricted speed, stop and proceed, stop at next signal, stop in two signals, clear to approach signal, slow, speed up, gain or lower elevation, and/or the like. The onboard computer may determine a signal status while traversing a route for a wayside device 216a-d (or 216e-h) associated with wayside unit 218a based on a device table 230a (or 230b) associated with wayside interface unit 218a (or 230b) in route data for the ancillary subdivision 210a (or 210b).

The onboard computer may store, determine, and/or communicate a status identifier from a plurality of status identifiers selected from a device table 232a (or 232b, 234a, or 234b) of an ancillary subdivision from a first vehicle network operator of an ancillary subdivision/district that may not be mapped to the same enforcement group by the second vehicle network operator intersecting the ancillary subdivision. For example, a first mapping for a signal group may be included in device table 230a (or 230b) of the wayside interface unit 218a (or 218b) and a second mapping for enforcing the signal group differently than a first signal group may be included in a device table 232a (or 232b, 234a, or 234b). In such an example, onboard computer receives device table 232a in route data of ancillary subdivision and retrieves a device status identifier from one or more device status identifiers stored in device table 232a associated with a wayside device 216a, mapped to a status identifier (e.g., status table ID, etc.). Onboard computer may retrieve or reference the device status table to translate (e.g., decode, map, etc.) a signal device status identifier (e.g., a signal's specific or unique code for a status device, etc.) differently than a first mapping for a signal group in device table 230a (or 230b) of the wayside interface unit 218a (or 218b).

Figure 3:
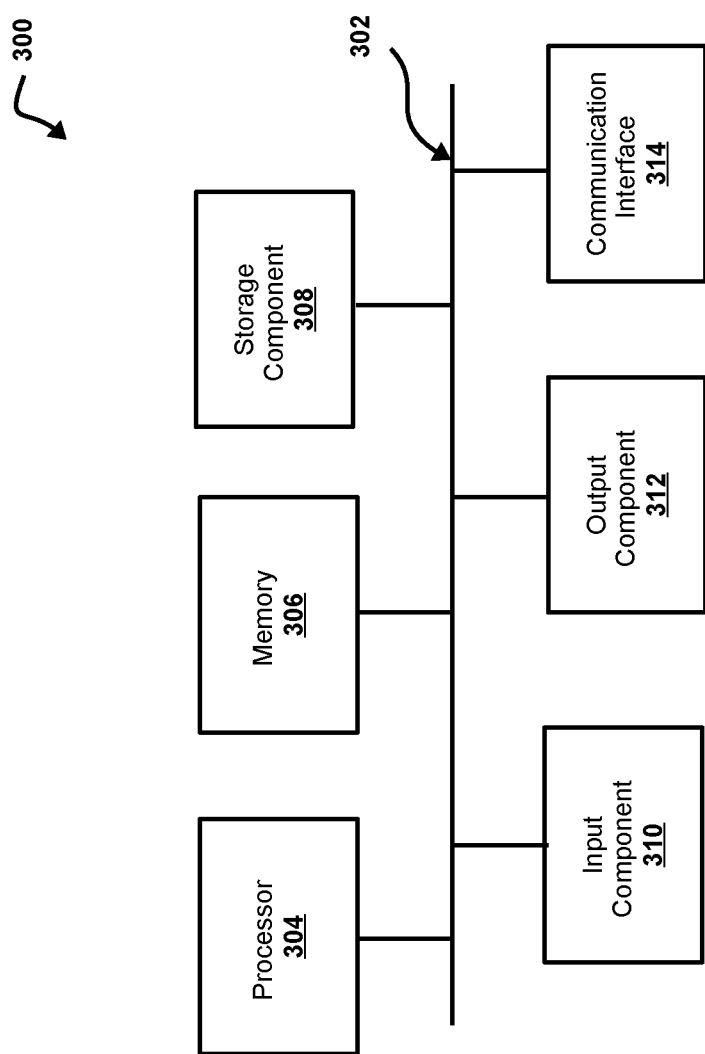
FIG. 3 is a diagram of a non-limiting embodiment or aspect of components of one or more devices and/or one or more systems of FIG. 1.

Referring now to FIG. 3, FIG. 3 is a diagram of example components of a controller 300. The controller corresponds to one or more devices of onboard computer in a vehicle that is in a vehicle group. The controller may include a bus 302, a processor 304, memory 306, a storage component 308, an input component 310, an output component 312, and a communication interface 314. Functionally, the controller may obtain route data, and ancillary by route data after identifying ancillary subdivision/districts.

The bus may include a component that permits communication. A suitable processor may be implemented in hardware, firmware, or a combination of hardware and software. Suitable processors may include, e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), and the like that can be programmed to perform a function. Suitable memory may include random access memory (RAM), read only memory (ROM), and/or another type of dynamic or static storage device (e.g., flash memory, magnetic memory, optical memory) that may store information and/or instructions for use by the processor.

A suitable storage component stores information and/or software related to the operation and use of the controller. A suitable storage component may include a hard disk (e.g., a magnetic disk, an optical disk, a magneto-optic disk, a solid state disk), a compact disc (CD), a digital versatile disc (DVD), a holographic disk, a floppy disk, a cartridge, a magnetic tape, and/or another type of computer readable medium, along with a corresponding drive.

The input component may permit the controller to receive information. Suitable mechanisms may include a touch screen display, a keyboard, a keypad, a mouse, a button, a switch, a microphone. Additionally, or alternatively, the input component may include a sensor for sensing information, such as a GPS component, an accelerometer, a gyroscope, an actuator, and the like. Other suitable sensors may include radar, lidar, TOF sensors, visual sensor, and the like. The output component may provide output information from the controller. Suitable output components may include one or more of a display, a speaker, one or more light-emitting diodes (LEDs).

The communication interface may include a transceiver-like component (e.g., a transceiver, a separate receiver and transmitter, etc.) that enables the controller to communicate with other devices. This may be done via a wired connection, a wireless connection, or a combination of wired and wireless connections. The communication interface can permit the controller to receive information from another controller, from the remote server at the back-office, or the like and/or provide information in response. For example, the communication interface may include an Ethernet interface, an optical interface, a coaxial interface, an infrared interface, a radiofrequency (RF) interface, a universal serial bus (USB) interface, a Wi-Fi interface, a cellular network interface, a CAN bus, and/or the like.

Taken together, the controller's components allow vehicle communication and control and coordination. This may happen within a single vehicle, where decisioning is made to operate the vehicle in different modes depending on which subdivision/district the vehicle is located in. This may happen within a vehicle group, where decisioning is made to operate various vehicles within the vehicle group based in part on the route data, or the ancillary route data, depending on whether the vehicle of the vehicle group is in one or the other of the regions. Of note, some vehicle systems may be very large and a significant portion of the vehicles of the vehicle group may be in subdistricts/divisions that are different (with one being ancillary to the other). In such a case, the controller for a vehicle will operate the vehicle according to the location of the vehicle and make the transition for a vehicle as the vehicle moves from one to the other. Thus, the vehicle group may move smoothly and continuously through the boundary between sub districts/divisions.

The vehicle network operator may need to dynamically alter vehicle groups moving through the routes of a network. The vehicle groups may be entering and leaving a particular vehicle network for a subdivision/district while these changes are being implemented. The controller may receive an update for the route data and the trip plan of a vehicle during the trip. This may require ancillary route data that was not previously contemplated as being of relevance. At this point, the vehicle network operator and the controller that is onboard a vehicle communicate to generate a new trip plan, new route data, and pull in any necessary ancillary route data that is needed as a result of the change. Additionally, a need to change a trip plan may come from an unplanned deviation from the route data. For example, if a route is damaged owing to harsh weather conditions or something equivalent, a new trip plan is generated (onboard by the controller, or requested by the controller of the remote server in the back-office) and the vehicle network operator is notified of the need for a change, the change itself, and in some cases the cause of the change. Knowing the cause of the change may allow for maintenance crews to be dispatched, for example.

The memory and/or storage component may include data storage or one or more data structures (e.g., a database, etc.). The controller may receive information from, store information in, communicate information to, or search information stored in the data storage or one or more data structures in memory 306 and/or storage component 308. In one embodiment, the information may include data (e.g., route data, sensor data, etc.) associated with one or more traversals of a route by one or more vehicles.

Alternative controllers may have additional components, fewer components, different components, or differently arranged components than those shown in FIG. 3. Additionally, or alternatively, a set of components (e.g., one or more components) may perform one or more functions described as being performed by another set of components.

Figure 4:
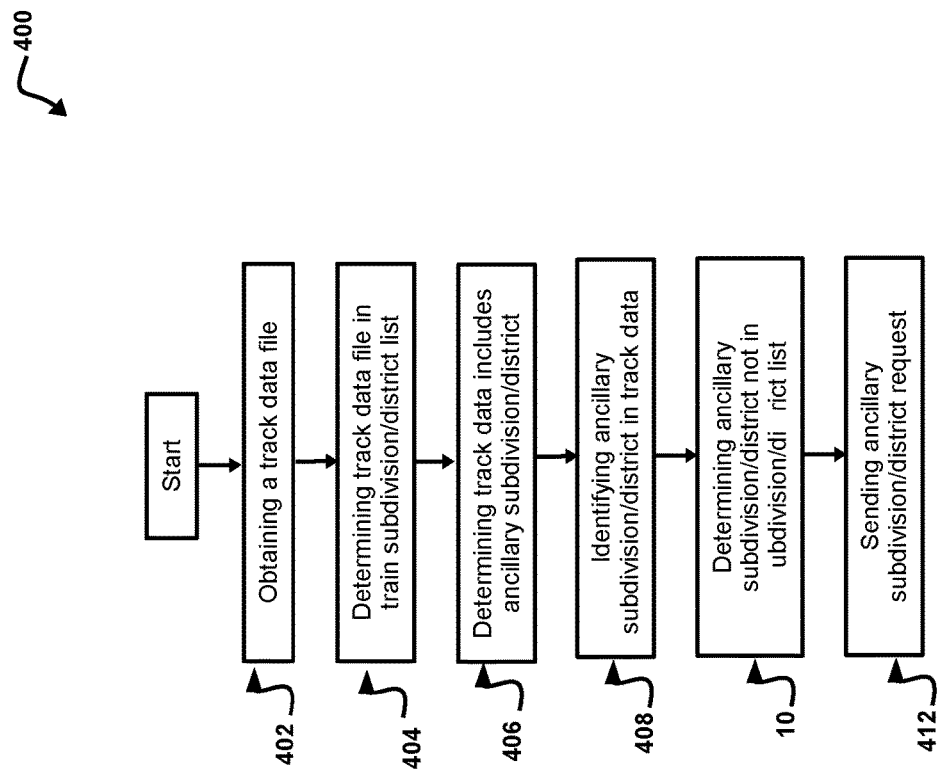
FIG. 4 is a flowchart of a non-limiting embodiment or aspect of a process for obtaining route data for interlocked subdivisions.

Referring now to FIG. 4, a flowchart is provided of a process 400 for identifying and requesting route data for ancillary subdivisions/districts. In one embodiment, one or more of the steps of the process are performed (e.g., completely, partially, etc.) by at least one of the onboard computer, navigation system, and/or remote server.

As shown in FIG. 4, at step 402, the process includes obtaining a route data file. For example, in one embodiment, the onboard computer receives or obtains route data (e.g., route data, route data file, etc.). As an example, a process starts when an onboard computer obtains and/or loads route data, for example, following receipt of a vehicle group subdivision/district list message during initialization, while the vehicle group is traversing a route, or if a current dataset list message is received in the polling process that indicates that the route data version has changed.

As shown in FIG. 4, at step 404, the process includes determining route data in a vehicle group subdivision/district list. For example, the onboard computer determines route data in a vehicle group subdivision/district list (e.g., one or more subdivisions, one or more districts, any combination thereof, etc.). As an example, onboard computer may determine if the newly-loaded route data is for a subdivision/district in the vehicle group subdivision/district list.

At step 406, the process includes determining the route data includes an ancillary subdivision/district. For example, the onboard computer determines that the route data includes an ancillary subdivision/district. For example, if the newly-loaded route data is for a subdivision/district in the vehicle group subdivision/district list, the onboard computer checks the route data for ancillary subdivision/districts that need to be loaded. If that route data is not for a subdivision/district in the vehicle group subdivision/district list, the onboard computer does not check the file for ancillary subdivision/districts, thus preventing recursive loading of route data.

At step 408, the process includes identifying an ancillary subdivision/district in the route data. For example, in one embodiment, the onboard computer identifies ancillary subdivision/district in route data. For example, for any ancillary subdivision/district referenced by the route data, the onboard computer checks whether the referenced subdivision/district is also in the vehicle group subdivision/district list. If so, the onboard computer may obtain that route data.

At step 410, the process includes determining an ancillary subdivision/district that is not in a current or available subdivision/district. For example, the onboard computer determines an ancillary subdivision/district which is not within a subdivision/district on the subdivision/district list.

At step 412, the process includes requesting an ancillary subdivision/district version. The onboard computer may send an ancillary subdivision/district version request that includes a vehicle network operator standard carrier alpha code ("SCAC"). The vehicle network operator SCAC of a vehicle network operator operates the ancillary subdivision/district. In addition, the request may include an interface version that identifies a specific collection of message versions, and a subdivision/district ID, which may be a subdivision identifier in a vehicle control system for the ancillary subdivision/district. For an ancillary subdivision/district not included in the route data, the onboard computer may send an ancillary subdivision/district version request message to a back-office system (e.g., remote server) at the vehicle network operator. The ancillary subdivision/district request message may be directed to either a crew interaction system or to a back-office system that is associated with a vehicle network operator's polygon. The onboard computer may not have a route location on a subdivision/district operated by the operating vehicle network operator of the ancillary subdivision/district. In some examples, the back-office system may have required information about which route data version the onboard computer should use even if that back-office system does not control the ancillary subdivision/district.

Figure 5:
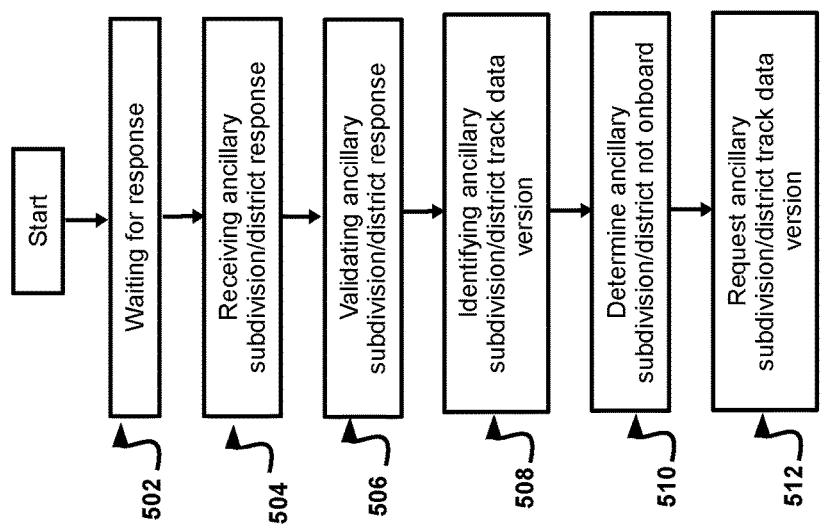
FIG. 5 is a flowchart of a non-limiting embodiment or aspect of a process for obtaining route data for interlocked subdivisions.

Referring now to FIG. 5, a flowchart is provided for a process 500 for responding to a request for route data for ancillary subdivision/districts. In one embodiment, one or more of the steps of process are performed (e.g., completely, partially, etc.) by at least one of the vehicle control system, the onboard computer or controller, the navigation system, and/or a remote server.

As shown in FIG. 5, at step 502, the process includes waiting for a response. The onboard computer waits until a response to an ancillary subdivision/district version request is received. One or more events may occur while the onboard computer is waiting for a response to the ancillary subdivision/district version request message from the onboard computer. Suitable events may include a determined time may elapse, route data may be discarded from an onboard computer, an ancillary subdivision/district may be added to a vehicle group's list of the one or more subdivision/districts, an onboard computer cuts out or fails to re-initialize, and/or the like. After a determined period, the onboard computer may resend an ancillary subdivision/district version request message since the onboard computer has not received a valid ancillary subdivision/district version message in response to a first request. In some examples, no limit is made on the number of retries as long as the route data file for a subdivision/district within the vehicle group's subdivision/district list includes a reference to this subdivision/district in the vehicle group's list of ancillary subdivision/district(s). Alternately, a notification may be made indicated the lack of response, or a diagnostic may be performed (to include a check of signal strength).

Whenever the onboard computer discards a route data file, the onboard computer may evaluate the subdivision/districts for which the onboard computer is trying to obtain route data version information or a route data file to determine whether any of those subdivision/districts are no longer ancillary. If the onboard computer determines that a subdivision/district is no longer ancillary, the onboard computer may cease trying to obtain version information for the route data file or the route data file itself for that subdivision/district.

If an ancillary subdivision/district is added to the vehicle group subdivision/district list, the onboard computer may stop sending ancillary subdivision/district request messages for that subdivision/district and instead obtain the route data file as specified in the existing design for subdivisions/districts in the vehicle group subdivision/district list. An example where this may occur is where the onboard computer starts to gather route data based on a vehicle group subdivision/district list message from one operating vehicle network operator and then receives another vehicle group subdivision/district list message from a second operating vehicle network operator that happens to include the ancillary subdivision/district. If the onboard computer state becomes noncontrolling, the onboard computer may stop trying to obtain the version of all ancillary subdivision/districts. The process of downloading route data from a server (e.g., a mobile device management server, etc.) may continue but the onboard computer may not load any route data file obtained from the server into active memory.

At step 504, the process includes receiving an ancillary subdivision/district response. For example, in one embodiment, the onboard computer receives an ancillary subdivision/district version response. For example, onboard computer receives an ancillary subdivision/district version message in response to a an ancillary subdivision/district version request message including a vehicle network operator standard carrier alpha code ("SCAC") (e.g., a vehicle network operator SCAC of a vehicle network operator that operates the ancillary subdivision/district, etc.), a subdivision/district ID (e.g., a subdivision/district identifier in a vehicle control system for an ancillary subdivision/district, etc.), route data version, a CRC hash of a route data version, a reason for sending, and/or the like.

At step 506, the process includes validating an ancillary subdivision/district response. For example, in one embodiment, the onboard computer validates an ancillary subdivision/district response. For example, onboard computer may validate an ancillary subdivision/district version message onboard computer receives by performing validation checks such as, determining that a vehicle network operator SCAC and subdivision/district ID match those requested in the ancillary subdivision/district version request message or performing any other validation checks of a back-office system message in accordance with the vehicle control system requirements.

In one embodiment, if an ancillary subdivision/district version message is invalid, an onboard computer may discard the invalid message and continue to wait for a valid message. In a further example, onboard computer may determine, in response to determining an ancillary subdivision/district version message is valid and indicates that a subdivision/district identifier is unrecognized, to stop sending request ancillary subdivision/district version messages for that subdivision/district. This may happen if the interlocked vehicle network operators have not coordinated the route data generation or maintenance.

At step 508, the process includes identifying an ancillary subdivision/district route data version. For example, in one embodiment, the onboard computer identifies an ancillary subdivision/district route data version. As an example, if an ancillary subdivision/district version message is valid and includes the route data file version information for the ancillary subdivision/district, the onboard computer may check whether the onboard computer has that version of route data in a data store. Based on determining onboard computer includes correct route data, the onboard computer may load that file into memory.

At step 510, the process includes determining that an ancillary subdivision/district was not included and is not available and/or onboard. For example, in one embodiment, the onboard computer determines an ancillary subdivision/district that is not in an onboard computer. For example, onboard computer may attempt to obtain the route data from a server (e.g., a mobile device manager ("MDM"), etc.) of an operating vehicle network operator of the ancillary subdivision/district if the ancillary subdivision/district is not included in at least one of the onboard computer, the remote server, the remote database, the route database, and/or the like.

At step 512, the process includes requesting an ancillary subdivision/district route data version. For example, in one embodiment, the onboard computer requests the ancillary subdivision/district route data version determined not onboard. As an example, onboard computer sends a request for the route data to a remote server of an operating vehicle network operator associated with the ancillary subdivision/district. If the onboard computer is successful in obtaining the correct version of the route data for the ancillary subdivision/district, the onboard computer may load the file into memory.

Figure 6A:
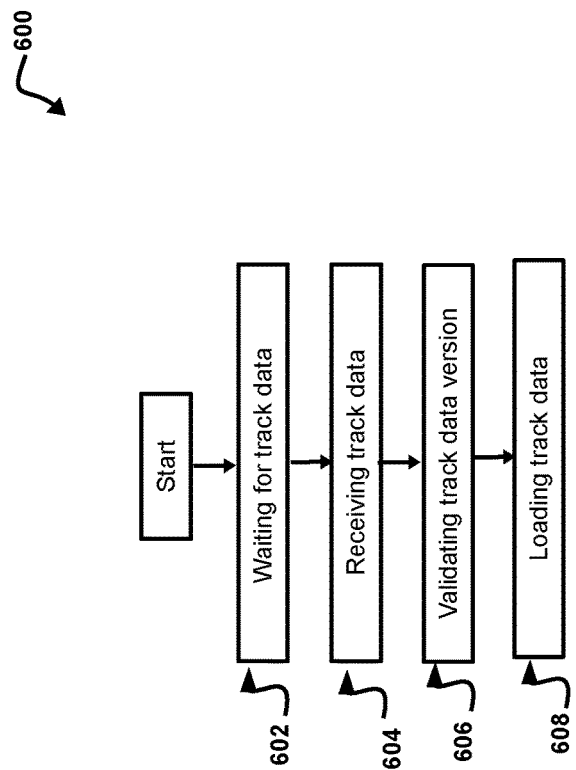
FIG. 6A is a flowchart of a non-limiting embodiment or aspect of a process for obtaining route data for interlocked subdivisions.

Referring to FIG. 6, a flowchart is provided of a process 600 for responding to a request for route data for ancillary subdivision/districts. In one embodiment, one or more of the steps of the process are performed (e.g., completely, partially, etc.) by onboard computer, navigation system, and/or remote server.

At step 602, the process includes waiting for route data. In one embodiment, the onboard computer waits for route data. As an example, the onboard computer waits for route data to download.

At step 604, the process includes receiving route data. For example, the onboard computer receives route data (e.g., a route data file, etc.) and optionally a trip plan. The onboard computer, or controller, receives the route data via wireless download. The download may come through a communication device and may be transmitted from a central dispatch or from a wayside device.

At step 606, the process includes validating route data. For example, the onboard computer validates route data for accuracy and freshness. The validation may include a checksum, cyclic redundancy check, or hash that accompanies or is embedded in the route data. Alternatively or additionally, the validation includes checking the route data against known values stored with or known to the onboard computer. One example is a time synchronization check where the onboard computer checks a date stamp on the route data with an internal clock. Another example is that the route data includes a vehicle ID, and the onboard computer checks the vehicle ID against its own and known vehicle ID. Yet another example is that the route data includes information about the makeup of the vehicle group to which the vehicle belongs, and the vehicle compares that information with either its own information about the vehicle group, polls the other members of the vehicle group to verify the accuracy of the vehicle group data, or monitors the performance of the vehicle group during the trip to note discrepancies in the operation of the actual vehicle group compared to modeled behavior for the vehicle group based on the vehicle group data in the supplied route data.

At step 608, the process includes loading route data. For example, in one embodiment, the onboard computer loads correct route data version. Once the onboard computer has obtained the route data file for an ancillary subdivision/district, the onboard computer may have the edge message protocol ("EMP") address for the controlling the back-office system with which to register for polling. However, the identifier to use as the onboard computer's vehicle group ID depends on the vehicle network operator operating the ancillary subdivision/district.

Figure 6B:
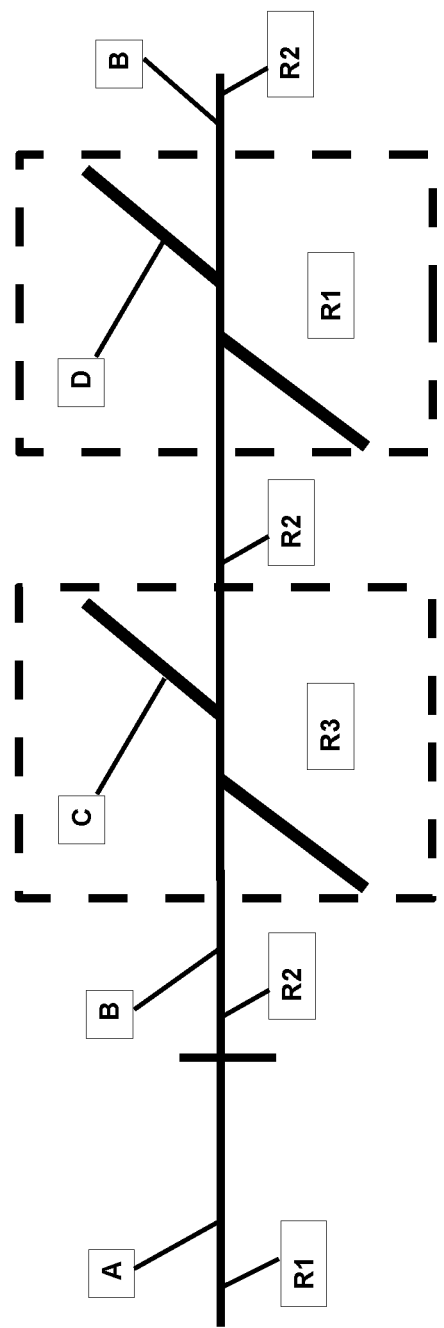
FIG. 6B are diagrams of exemplary ancillary subdivision/districts of an implementation of one or more processes as disclosed herein.

Referring now to FIG. 6B, a vehicle network operator that is operating an ancillary subdivision/district issues a unique vehicle group ID for at least one of the bulletins issued to an individual vehicle group. A crew or an onboard controller may acknowledge receipt of the bulletins. A movement authority may then be issued from the office (e.g., pass signal at stop) to begin traverse of the ancillary subdivision/district that is subject to the bulletin. Sometimes, a unique vehicle group ID assignment is not necessary, and a vehicle ID may be used in place of the vehicle group ID (acting as a proxy for the vehicle group). A vehicle group ID may or may not have been established for an ancillary subdivision/district earlier, as the ID may not have been necessary at that time. In an example, subdivision/districts A and B are in the vehicle group subdivision/district list. Vehicle network operators (R1 and R2) are operating subdivision/districts A and B, respectively, and are selected at initialization. A vehicle group ID was established for both of those vehicle network operators. In a contrasting example, subdivision/districts C and D are ancillary subdivision/districts. The vehicle network operator (R3) including subdivision/district C was not selected as an operating vehicle network operator at initialization so no vehicle group ID has been established for subdivision/district C. In addition, Subdivision/district D is not included in the subdivision/district list from the vehicle network operator (R1). Were this to occur, and vehicle network operator (R1) operating the vehicle network at initialization when the vehicle group ID is established and because vehicle network operator (R1) operates both subdivision/district A and subdivision/district D. So, the vehicle network operator (R1) knows of the vehicle group identifier and does not need to issue (or reissue) a new unique vehicle group ID, but can use (or reuse) the initially assigned vehicle group ID.

In one embodiment, when a vehicle network operator that operates an ancillary subdivision/district is selected by an operator the vehicle group ID established for that vehicle network operator during initialization may be used. If the vehicle network operator that operates an ancillary subdivision/district was not selected or notified as an operating vehicle network operator at initialization, interactions between the back-office system, an error checking service, and onboard computer may use the vehicle group ID obtained and assigned via a message exchange.

In one embodiment, an onboard computer may maintain an ancillary subdivision/district list for each vehicle network operator that operates a subdivision/district ancillary to a subdivision/district in the vehicle group subdivision/district list as the operator goes through the process of obtaining route data. This list of subdivision/districts may identify an ancillary subdivision/district operated by each vehicle network operator and the subdivision/district(s) on the vehicle group subdivision/district list to which the subdivision/district(s) is or are ancillary.

The ancillary subdivision/district list may assist the back-office in determining which mandatory directives should be associated with the vehicle group ID. The remote server may use the links between the ancillary subdivision/district and the vehicle group subdivision/district list to identify the specific sections of route to be traversed by the vehicle group to filter mandatory directives associated with the vehicle group or determine which crew acknowledgement of bulletin request messages to send to the onboard computer.

Figure 7:
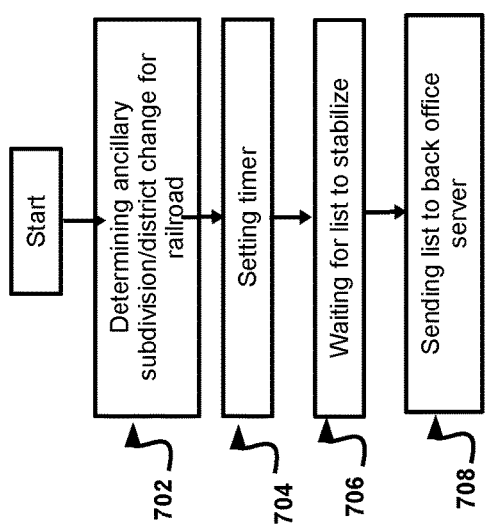
FIG. 7 is a flowchart of a non-limiting embodiment or aspect of a process for obtaining route data for interlocked subdivisions.

Referring now to FIG. 7, a flowchart is provided for a process 700 for obtaining route data based on an ancillary subdivision/district list change. In one embodiment, one or more of the steps of process may be performed (e.g., completely, partially, etc.) by onboard computer, navigation system, and/or remote server.

At step 702, the process includes determining an ancillary subdivision/district change for a vehicle network operator. The onboard computer updates a vehicle network operator's ancillary subdivision/districts. A vehicle group ID and ancillary subdivision/district list information exchange may be initiated when a vehicle network operator's ancillary subdivision/district list changes onboard. A new message pair may be added to the vehicle control system to allow the back-office of a vehicle network operator that operates an ancillary subdivision/district to assign a vehicle group ID if no vehicle group ID was established during onboard initialization, and communicate the list of ancillary subdivision/districts operated by that vehicle network operator to the back-office.

If enabled for the vehicle network operator that operates an ancillary subdivision/district, the onboard computer directs an ancillary subdivision/district list and vehicle group ID request message to the crew interaction back-office system. If disabled, the onboard computer may direct the ancillary subdivision/district list and vehicle group ID message. The process of exchanging a vehicle group ID and ancillary subdivision/district list information starts when a vehicle network operator's ancillary subdivision/district list changes onboard.

Frequent changes to the ancillary subdivision/district list may be made as the onboard computer accepts vehicle group subdivision/district list messages and loads route data for subdivision/districts on the vehicle group subdivision/district list toward the end of initialization.

At step 704, the process includes setting a timer. For example, in one embodiment, the onboard computer sets a timer. For example, the onboard computer may set a configurable timer. To avoid flooding back-office systems with multiple ancillary subdivision/district lists and vehicle group ID messages, the onboard computer may set a configurable timer whenever the ancillary subdivision/district list changes for a vehicle network operator.

At step 706, the process includes waiting for the vehicle group subdivision/district list to stabilize. The onboard computer may wait for vehicle group subdivision/district list changes to stabilize. The onboard computer may determine a configurable period has elapsed with no further changes to the list. Or, the rate of changes drops below a determined threshold value.

At step 708, the process includes sending the subdivision/district list to back-office server. For example, in one embodiment, the onboard computer sends the ancillary subdivision/district list and vehicle group ID to back-office system. The onboard computer sends the ancillary subdivision/district list and vehicle group ID message to the back-office system. If the vehicle network operator is an operating vehicle network operator selected for initialization the onboard computer may populate the ancillary subdivision/district list and vehicle group ID message by using the vehicle group ID established for that vehicle network operator during initialization. This may include a vehicle network operator SCAC, an interface version, a vehicle group ID description, a vehicle group ID, a vehicle group ID length (e.g., a numeric value, etc.), and a number of ancillary subdivision/districts. For an ancillary subdivision/district that is included, a portion of the ancillary subdivision/district list and vehicle group ID message may include an ancillary subdivision/district ID, a number of adjoining subdivisions/districts. For an adjoining subdivision, an ancillary subdivision/district list and vehicle group ID message may include an adjoining vehicle network operator SCAC and an adjoining subdivision ID.

If a vehicle network operator is not an operating vehicle network operator selected for initialization and if the onboard computer has not accepted an ancillary vehicle group ID message from that vehicle network operator since initialization, then this may indicate that no vehicle group ID has been established in the ancillary subdivision/district list and vehicle group ID message. If a vehicle network operator is not an operating vehicle network operator selected for initialization and the onboard computer has accepted an ancillary vehicle group ID message from that vehicle network operator since initialization, the onboard computer may populate the ancillary subdivision/district list and vehicle group ID message by using the vehicle group ID provided in the previous ancillary vehicle group ID message.

Figure 8:
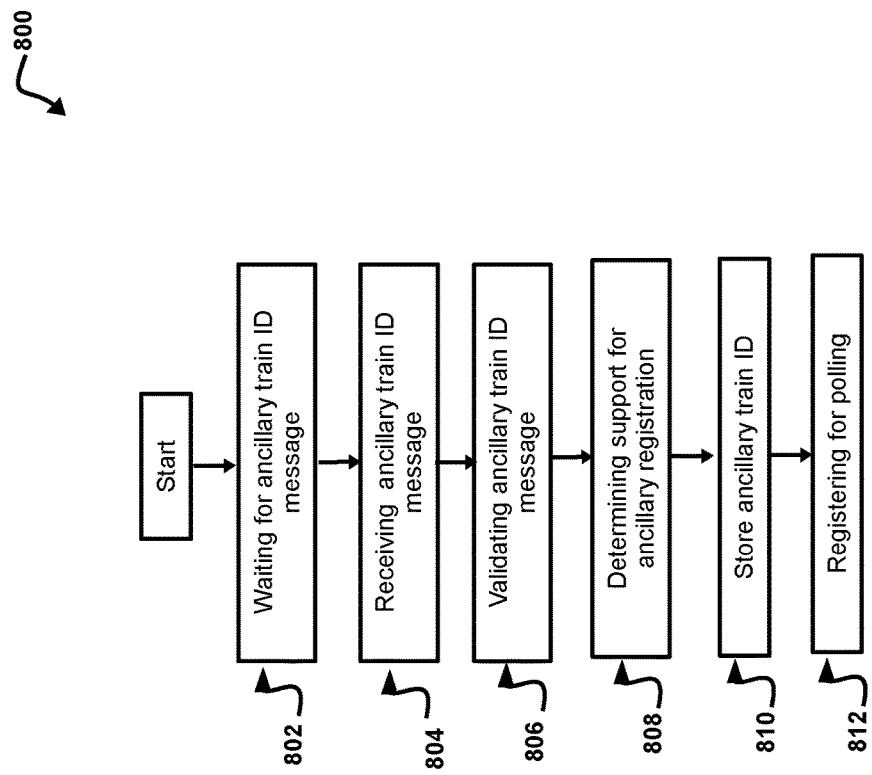
FIG. 8 is a flowchart of a non-limiting embodiment or aspect of a process for obtaining route data for interlocked subdivisions.

Referring now to FIG. 8, a flowchart if provided for a process 800 for responding to an ancillary subdivision/district list change. In some nonlimiting embodiments or aspects, one or more of the steps of the process are performed (e.g., completely, partially, etc.) by onboard computer, navigation system, and/or remote server.

At step 802, the process includes waiting for an ancillary vehicle group ID message. For example, in one embodiment, the onboard computer waits for a response to an ancillary vehicle group ID message. As an example, several events may occur while the onboard computer is waiting for a response to an ancillary subdivision/district list and vehicle group ID message (e.g., time elapses, onboard computer fails, onboard computer reinitializes, etc.), in response, for example, onboard computer may resend a message and wait for a response.

At step 804, the process includes receiving an ancillary vehicle group ID message. For example, in one embodiment, the onboard computer receives an ancillary vehicle group ID message including a vehicle network operator standard carrier alpha code ("SCAC").

At step 806, the process includes validating the ancillary vehicle group ID message. For example, in one embodiment, the onboard computer validates the ancillary vehicle group ID message. Onboard computer may validate the message when the message is received, such as, by performing checks including at least one of determining that the vehicle network operator standard carrier alpha code matches that in the ancillary subdivision/district list and vehicle group ID message, or performing any other validation checks of a back-office system message in accordance with the vehicle control system requirements.

In one embodiment, if the ancillary vehicle group ID message is invalid, the onboard computer may discard the message and continue to wait for a valid ancillary vehicle group ID message.

At step 808, the process includes determining support for ancillary registration. For example, in one embodiment, the onboard computer determines if polling registration for ancillary subdivision/districts is available. As an example, a configuration parameter set in a back-office system may indicate whether a vehicle network operator supports poll registration for ancillary subdivision/districts.

The onboard computer may determine a vehicle network operator dispatcher system (e.g., computer aided dispatcher, etc.) supports ancillary vehicle group registration. For example, if the vehicle network operator supports poll registration for ancillary subdivision/districts, onboard computer may also determine, based on a configuration parameter set in a back-office system, if a dispatcher for a vehicle network operator supports ancillary vehicle group ID assignment. As an example, onboard computer may request a vehicle group ID from a dispatcher upon receipt of the ancillary subdivision/district list and vehicle group ID message from a locomotive that has not already been assigned a vehicle group ID.

The onboard computer may determine the ancillary vehicle group ID message is valid and indicates that the back-office system does not support registration for ancillary subdivision/districts, the onboard computer may stop sending ancillary subdivision/district list and vehicle group ID messages for that vehicle network operator and may not attempt to register for polling for any of the ancillary subdivision/districts operated by that vehicle network operator.

At step 810, the process includes storing an ancillary vehicle group ID. For example, in one embodiment, the onboard computer stores an ancillary vehicle group ID. In one embodiment, the process includes determining if a vehicle group ID is a non-zero length vehicle group ID. In one embodiment, the process includes determining if a vehicle group ID is already established in an onboard computer. For example, if the vehicle group ID is not established, onboard computer may store a vehicle group ID changed from a previous vehicle group ID. As an example, onboard computer may store the vehicle group ID from the ancillary vehicle group ID message and begin registering for polls for the ancillary subdivision/district(s) using that vehicle group ID.

At step 812, the process includes registering for polling. For example, in one embodiment, the onboard computer sends a poll registration message to a back-office system that controls an ancillary subdivision/district. The onboard computer registers for polling in a back-office system.

Figure 9:
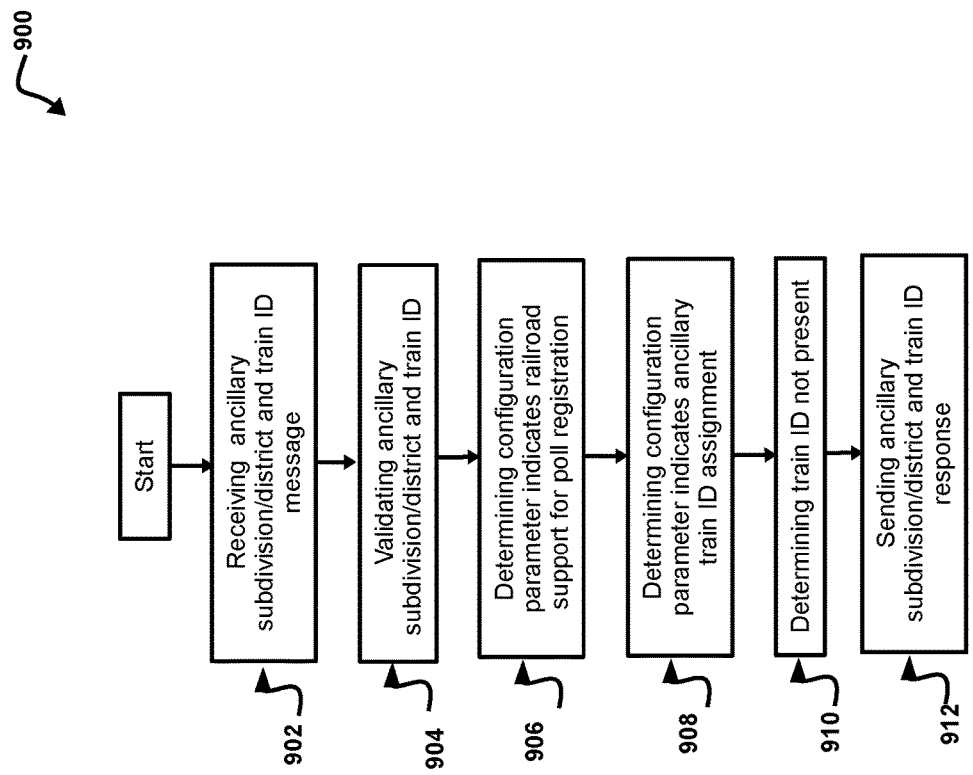
FIG. 9 is a flowchart of a non-limiting embodiment or aspect of a process for obtaining route data for interlocked subdivisions.

Referring now to FIG. 9, a flowchart is provided for a process 900 for responding to an ancillary subdivision/district and vehicle group ID request. In one embodiment, one or more of the steps of the process are performed (e.g., completely, partially, etc.) by onboard computer, navigation system, and/or remote server.

At step 902, the process includes receiving an ancillary subdivision/district and vehicle group ID message. The remote server receives an ancillary subdivision/district and vehicle group ID message. The remote server determines a response to an ancillary subdivision/district list and vehicle group ID request.

At step 904, the process includes validating the ancillary subdivision/district and vehicle group ID. For example, in one embodiment, the remote server validates the ancillary subdivision/district and vehicle group ID. If the ancillary vehicle group ID message is valid and indicates that the back-office system supports registration for ancillary subdivision/districts the onboard computer may evaluate the vehicle group ID returned in the message.

At step 906, the process includes determining a configuration parameter indicates vehicle network operator support for poll registration. The remote server returns a configuration parameter to indicate vehicle network operator support for poll registration.

At step 908, the process includes determining a configuration parameter indicates ancillary vehicle group ID assignment. For example, in one embodiment, remote server returns a configuration parameter to indicate an ancillary vehicle group ID assignment. For example, remote server sets a configuration parameter if a dispatcher (e.g., a dispatch computer, a remote server, etc.) for a vehicle network operator supports ancillary vehicle group ID assignment.

At step 910, the process includes determining a vehicle group ID is not present. The remote server may request a vehicle group ID from a dispatcher upon receipt of the ancillary subdivision/district list and vehicle group ID message from a locomotive that has not already been assigned a vehicle group ID (e.g., send a request upon receipt of an ancillary subdivision/district list and vehicle group ID message from a locomotive that has not already been assigned a vehicle group ID, etc.). In another example, a remote server may not support ancillary vehicle group ID assignment and may generate a vehicle group ID according to the vehicle network operator's vehicle group ID format specifications.

In one embodiment, remote server may return a zero length vehicle group ID in the ancillary vehicle group ID message. This may indicate that the onboard computer may stop sending ancillary subdivision/district list and vehicle group ID messages for that vehicle network operator and may not attempt to register for polling for any of the ancillary subdivision/districts operated by that vehicle network operator. The remote server may return a non-zero length vehicle group ID in the ancillary vehicle group ID message to indicate onboard computer does not have a vehicle group ID for the vehicle network operator operating the ancillary subdivision/district either via initialization or from a previous ancillary vehicle group ID message. If a vehicle network operator is an operating vehicle network operator selected for initialization and remote server returns an ancillary vehicle group ID message having a same vehicle group ID sent in an ancillary subdivision/district list and vehicle group ID message (e.g., a vehicle group ID established during initialization, etc.), an onboard computer may begin registering for polls for the ancillary subdivision(s)/district(s) using that vehicle group ID. In a further example, onboard computer may support only one vehicle group ID per vehicle network operator, if the vehicle network operator is an operating vehicle network operator selected for initialization and the ancillary vehicle group ID message includes a different vehicle group ID from the one sent in the ancillary subdivision/district list and vehicle group ID message, the onboard computer may not attempt to register for polling for any of the ancillary subdivision/districts operated by that vehicle network operator.

In one embodiment, if a vehicle network operator is not an operating vehicle network operator selected for initialization and remote server returns an ancillary vehicle group ID message having a different non-zero vehicle group ID than the one sent in the ancillary subdivision/district list and vehicle group ID message, an onboard computer may discard a previously stored vehicle group ID and re-register for polling for the ancillary subdivision(s)/district(s) with the new vehicle group ID.

At step 912, the process includes sending an ancillary subdivision/district and a vehicle group ID response. For example, in one embodiment, the back-office system sends an ancillary subdivision/district and a vehicle group ID response.

Figure 10:
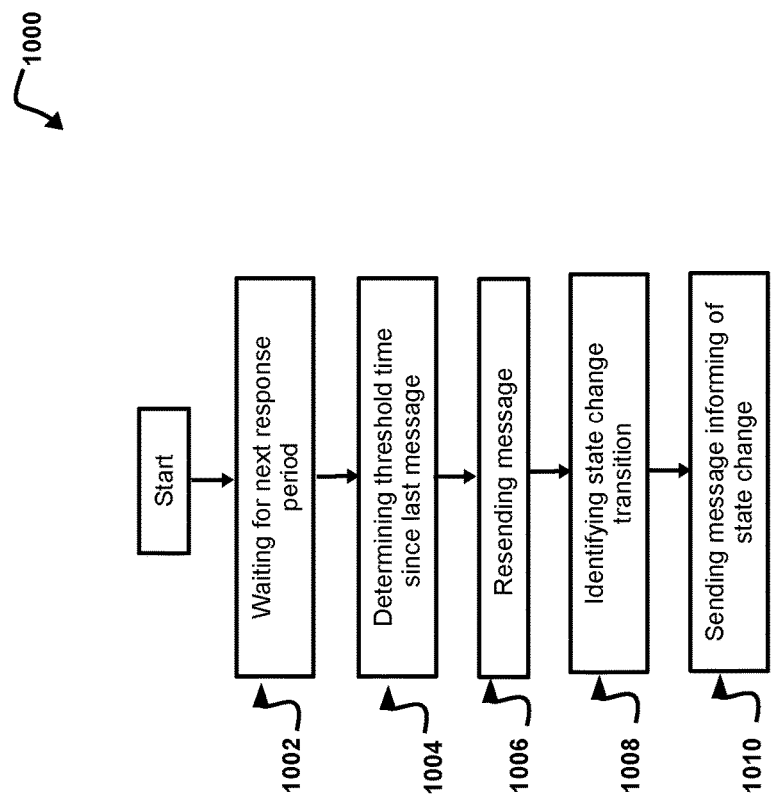
FIG. 10 is a flowchart of a non-limiting embodiment or aspect of a process for obtaining route data for interlocked subdivisions.

Referring now to FIG. 10, a flowchart is provided of a process 1000 for periodically synchronizing ancillary subdivision/district information. In one embodiment, one or more of the steps of the process are performed (e.g., completely, partially, etc.) by onboard computer, navigation system, and/or remote server.

At step 1002, the process includes waiting for a next response period. For example, in one embodiment, the onboard computer waits for the next response period.

At step 1004, the process includes determining a threshold time since last message. For example, in one embodiment, the onboard computer determines a threshold time since the last message. For example, onboard computer determines a predetermined number of seconds have elapsed since sending an ancillary subdivision/district list and vehicle group ID message and the onboard computer has not received a valid ancillary vehicle group ID message in response.

At step 1006, the process includes resending a message. For example, in one embodiment, the onboard computer resends a message. As an example, onboard computer resends an ancillary subdivision/district list and vehicle group ID message. The onboard computer may send the ancillary subdivision/district list and vehicle group ID message up to a configurable number of times (e.g., 3, 10, etc.). In addition to sending the ancillary subdivision/district list and vehicle group ID message upon a change in the ancillary subdivision/district list, while the onboard computer is in a controlling state (active, disengaged, or restricted), the onboard computer may send the ancillary subdivision/district list and vehicle group ID message periodically at a configurable rate. This allows the back-office system to synchronize the ancillary subdivision/district information with the onboard computer.

At step 1008, the process includes identifying a state change transition. For example, in one embodiment, the onboard computer identifies a state change transition. For example, an absence of an ancillary vehicle group ID message from remote server may indicate to an onboard computer that a failure of the communication segment to deliver messages has occurred. An absence of an ancillary vehicle group ID message from remote server may indicate to an onboard computer that a back-office system may not recognize the ancillary subdivision/district list and vehicle group ID messages onboard computer is receiving from the onboard computer because the onboard computer has not been updated to support poll registration for ancillary subdivision/districts. In such an example, onboard computer may not distinguish between a failure and a recognition failure and may continue to retry the ancillary subdivision/district list and vehicle group ID message as described above. When the onboard computer transitions to a non-controlling state (cut out, failed, or initializing) the onboard computer may stop sending ancillary subdivision/district list and vehicle group ID messages. The onboard computer may inform the back-office of the state change of the onboard computer with a locomotive system state message.

At step 1010, the process includes sending a message informing of a state change. For example, in one embodiment, the onboard computer sends a message informing of a state change.

In one embodiment, onboard computer may send a poll registration message to the back-office system that controls an ancillary subdivision/district when the onboard computer has loaded the route data file for that ancillary subdivision/district and the onboard computer has accepted an ancillary vehicle group ID message with a 'reason for sending' indicating that registration for ancillary subdivision/districts is supported and a valid vehicle group ID for the vehicle network operator that operates that subdivision/district. For example, a 'reason for sending' field may be added to a poll registration message to indicate to the back-office system whether a registration is for a subdivision/district in the vehicle group subdivision/district list, an ancillary subdivision/district operated by a vehicle network operator which is also an operating vehicle network operator selected for initialization, an ancillary subdivision/district operated by a vehicle network operator which was not selected as an operating vehicle network operator for initialization, and/or the like.

In one embodiment, onboard computer may determine a polling rate based at least in part on a distance between a GPS location and a closest point in the ancillary subdivision/district, just as the onboard computer does for subdivisions/districts in the vehicle group subdivision/district list. Other information for determining the polling rate may include the calculated or actual speed of a vehicle in the vehicle group, the traffic congestion in the route network over which the vehicle group travels, a time of day, a health status of the vehicle, a health status of the route, a strength or clarity of the communication pathway, and the like. If conditions are nominal, and the communication system is stable, then the polling attempts may be spaced further apart compared to a situation where the vehicle, the route or the communication path are experiencing difficulties.

In one embodiment, a new enumeration may be added to a 'reason for sending' field in a confirmation of poll registration message to indicate that a back-office system does not support poll registration for ancillary subdivisions/districts. As an example, a vehicle network operator may use an enumeration prior to the back-office systems being updated to support ancillary subdivision/district polling. The back-office system may respond with a confirmation of poll registration message. For example, if the message indicates that a back-office system does not support ancillary subdivision/district polling, an onboard computer may stop attempts to register for polling for the ancillary subdivision/district.

In one embodiment, if a back-office system positively acknowledges a poll registration, the back-office system may begin sending office segment poll messages at the requested poll rate. An office segment poll message may combine information for ancillary subdivision/districts and subdivisions/districts in a vehicle group subdivision/district list controlled by the same back-office system.

In one embodiment, a vehicle group subdivision/district list uses error checking code to send an office segment poll message that was not selected as an operating vehicle network operator during initialization. A suitable error checking code is cyclical redundancy check ("CRC"). The back-office system may populate the vehicle group subdivision/district list CRC field with zeroes. The ancillary subdivision/district list provided by the onboard computer in the ancillary subdivision/district list and vehicle group ID message need not be propagated by dispatcher to affected back-office system instances. The back-office system may restrict polling to only vehicle groups that have a valid vehicle group subdivision/district list. The back-office system may need to be updated to allow polling for ancillary subdivision/districts.

A configuration version list CRC may be used in a back-office system to populate a field according to a specific server configuration associated with a locomotive ID.

A dataset CRC may be used to populate according to mandatory directives. Mandatory directives may include one or more bulletins and/or movement authorities. The mandatory directives may be for the subdivision associated with the vehicle group ID established.

The composite CRC (e.g., ICR3, etc.) may populate the field according to the information provided by individual and composite CRC calculator ("IC3") for the subdivision/district associated with the vehicle group ID established.

The onboard computer may deregister for polls for an ancillary subdivision/district if onboard computer transitions out of a controlling state or an ancillary subdivision/district is removed from the onboard computer's ancillary subdivision/district list. An out of a controlling state may be active, disengaged, restricted, and the like.

If the onboard computer receives a configuration version list CRC in an office segment poll message from a vehicle network operator that operates an ancillary subdivision/district, but was not selected as an operating vehicle network operator during initialization, the onboard computer may request the configuration version list from the back-office system that sent the message. If the software and common configuration fileset versions loaded on the onboard computer are preferred or acceptable for that vehicle network operator, the onboard computer may validate that the onboard computer has a compatible preferred or acceptable vehicle network operator specific configuration fileset for the vehicle network operator.

The onboard computer may mark the ancillary subdivision/district controlled by that vehicle network operator as 'non-synchronized' to indicate the software or a common configuration fileset version loaded onto onboard computer is not preferred (e.g., acceptable, etc.) for the vehicle network operator, that there is no preferred vehicle network operator specific configuration fileset compatible with the currently loaded software, and/or the like. In this way, the onboard computer can operate over a majority of the planned routes in an active state while degrading to the disengaged state for exceptions where a vehicle network operator does not comply with a versioning convention. Gradations and levels of synchronization may be accounted for. A more recent de-syncing event may be given more weight than a desynchronized file that is also older. The presumption is that de-synchronicity increases over time. Further, not all route data may be weighted equally with regard to de-synchronization. That is, the system may presume that the basic characteristics of the route do not change immediately (such as the location of a bridge) but the occupancy of the route may change rapidly. The onboard computer or controller accounts for this weighting difference in determining vehicle operation in a de-synchronized subdivision/district or ancillary subdivision/district.

The onboard computer may use the vehicle network operator specific configuration parameter settings of the vehicle network operator operating an ancillary subdivision/district for targets on the route in that subdivision.

The onboard computer may synchronize datasets for an ancillary subdivision/district with the back-office system. The onboard computer may request the current dataset list and request the mandatory directives that the onboard computer needs for the ancillary subdivision/district. The onboard computer may send a validation request to ensure that there are no pending updates.

In one embodiment, a back-office system may not send a request to a dispatcher for the subdivision/district list for a specific vehicle group when the onboard computer registers for polling for an ancillary subdivision/district as indicated in the 'reason for sending' field being added to the poll registration message. In such an example, back-office system may deliver to the onboard computer only those bulletins for that subdivision/district that do not explicitly identify vehicle groups, or are addressed to the vehicle group ID assigned by the dispatcher.

If the ancillary vehicle network operator issues movement authority to vehicle groups, the dispatching system grants movement authority to the vehicle group ID that was assigned by the dispatcher. No movement authority can be granted to a vehicle group ID generated by the back-office system. The dispatcher may, however, validate the vehicle group ID assigned by the back-office system and, in doing so, the vehicle group ID becomes de facto dispatcher-issued.

It is possible for a mandatory directive to span an ancillary subdivision/district and a subdivision/district in the vehicle group subdivision/district list if both subdivisions/districts are operated by the same vehicle network operator. The back-office system, IC3, and onboard computer may handle this type of spanning mandatory directive in the same manner as the back-office system, IC3, and onboard computer handle mandatory directives that span subdivisions/districts in the vehicle group subdivision/district list.

In one embodiment, back-office system and IC3 may interact with each other using the vehicle group ID used to register for polling in a poll registration message. Further, the onboard computer may validate the IC3 uniqueness index, composite error checking code, and individual dataset error checking code.

The onboard computer may display the text of any mandatory directive accepted for an ancillary subdivision/district in the same manner as onboard computer does for subdivisions/districts in the vehicle group subdivision/district list. A bulletin order may be conveyed for an ancillary subdivision/district with a bulletin sequence message in the same manner as for subdivisions/districts in the vehicle group subdivision/district list.

The onboard computer may prompt the crew or the onboard vehicle control system to acknowledge bulletins for ancillary subdivision/district based on the information received in the crew acknowledgement of bulletin request message in the same manner as the onboard computer does for bulletins in the subdivisions/districts in the vehicle group subdivision/district list. If acknowledgement of a bulletin is required, the dispatching system may need to address the request to the vehicle via the vehicle group ID.

Synchronizing the mandatory directives for ancillary subdivision/districts, in addition to the subdivisions/districts in the vehicle group subdivision/district list, may include additional storage capabilities by the onboard computer. As an example, the onboard computer may negatively acknowledge and discard any mandatory directive dataset which the onboard computer cannot store and set the subdivisions/districts spanned by that mandatory directive to non-synchronized.

In one embodiment, an ancillary subdivision/district list and vehicle group ID message allows the onboard computer to provide a list of adjoining subdivisions/districts to an ancillary subdivision/district. The vehicle network operator operating the ancillary subdivision/district may use this list to bound the list of bulletins addressed to a vehicle group. The back-office system may filter the delivery of bulletins addressed to all vehicle groups, for example, based on route geometry or polling type.

The onboard computer may report authority violations when the point of violation is on an ancillary subdivision/district to the back-office system that controls that ancillary subdivision/district and back-office system may forward authority violation messages to all vehicles that are registered for polls for that subdivision.

In an example where vehicle group A has violated an authority on an ancillary subdivision/district, the violation is reported to vehicle group B which has registered for polls on that subdivision/district because the subdivision/district is on vehicle group B's subdivision/district list. Vehicle group C also receives the violation report because the vehicle group C has registered for polls on that subdivision/district as an ancillary subdivision/district. As an example, a vehicle group may not be notified of any authority violation with a point of violation on the subdivision/district since the vehicle group has not registered for polling on that subdivision/district.

Figure 11:
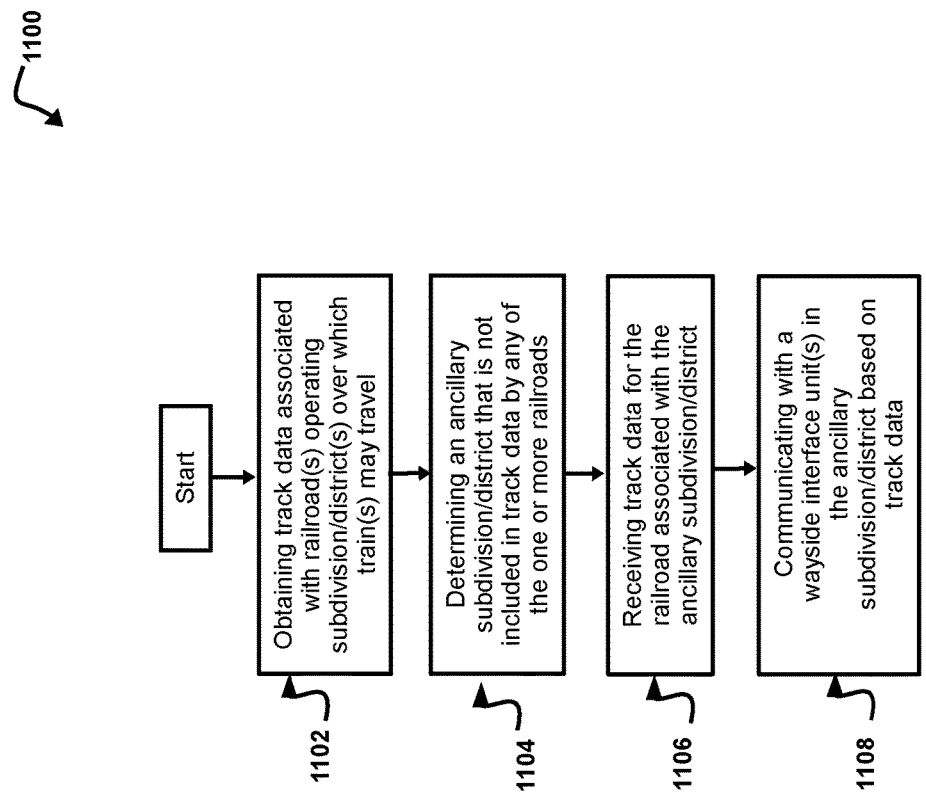
FIG. 11 is a flowchart of a non-limiting embodiment or aspect of a process for obtaining route data for interlocked subdivisions.

Referring now to FIG. 11, a flowchart is provided of a process 1100 for responding to an ancillary subdivision/district and vehicle group ID request. In one embodiment, one or more of the steps of process 1100 are performed by onboard computer, navigation system, and/or remote server.

At step 1102, the process includes obtaining route data associated with vehicle network operators operating subdivision(s)/district(s) over which vehicle groups may travel. The onboard computer obtains route data associated with one or more vehicle network operators operating one or more subdivisions/districts over which a vehicle group may travel.

The onboard computer initializes the onboard computer by providing information including employee credentials and the one or more vehicle network operators over which the vehicle group is expected to travel. In addition, onboard computer may receive, from a remote server 120 (e.g., a back-office server, etc.), at least one of a list of subdivisions/districts the vehicle group is expected to operate over or through.

At step 1104, the process includes determining an ancillary subdivision/district that is not included in route data by any of the one or more vehicle network operators. For example, in one embodiment, onboard computer determines an ancillary subdivision/district that is not included in route data by any of the one or more vehicle network operators.

The process includes determining a first subdivision/district having at least one route segment intersecting a second subdivision/district. The second subdivision/district is not operated by the same vehicle network operator as the first. The first subdivision/district includes the route segment, and or one or more wayside systems. The second subdivision/district is ancillary to the first.

The onboard computer may register for polling the ancillary subdivision/district with the ancillary vehicle network operator. The ancillary vehicle network operator of the ancillary subdivision/district determines a new vehicle group ID of the vehicle group and sends the new group ID to the vehicle group, and the vehicle group registers a polling request for the ancillary subdivision/district based on the new vehicle group ID. Otherwise the onboard computer uses the first vehicle group ID assigned to the onboard computer. The onboard computer may not register for polling with an ancillary vehicle network operator until the onboard computer has obtained a new vehicle group ID. The vehicle network operator may be notified of the movement of the vehicle group to the ancillary subdivision/district and of the assignment of the new vehicle group ID. The new and original vehicle group IDs may be associated with each other by the vehicle network operator, the ancillary vehicle network operator, the back-office server, and the onboard computer or controller. In one embodiment, the ancillary vehicle network operator requests the first-assigned vehicle group ID and rather than issue a new one assigns or affirms that the vehicle group ID is valid and available for use in the ancillary subdivision/district.

The controller or onboard computer may send or register a polling request for a back-office system of the ancillary vehicle network operator. The polling request may include a vehicle group ID (or at least a request for a vehicle group ID, or a validation/acceptance of an existing vehicle group ID). The onboard computer may receive a confirmation of poll registration from the back-office system, and may receive poll messages including a hash (or other error checking code) over a list of mandatory directive identifiers and a route data version. The onboard computer may validate the route data. The onboard computer may check that a route data version is based on a matching request. The vehicle group ID may include a vehicle ID, a vehicle group ID established during initialization, and/or a vehicle group ID assigned by the back-office system responding to the polling request. One or more poll messages may include a hash over a dataset pertinent to the subdivision including one or more of an identifier and CRC of 0 or more authorities, an identifier and CRC of 0 or more bulletins, a version and CRC of current route data file. The on-board computer may make a subsequent request ("Request Current Dataset") in order to obtain the source data for the hash or error checking code.

The onboard computer may receive poll messages periodically. In one embodiment, the poll messages may include an identifier of at least one of a form-based authority, a bulletin, a speed restriction, or a null list of mandatory directive identifiers. Polling messages may be pushed by the back-office server based on changes to operating conditions of the vehicle network. Crashes, outages, re-routes and the like may initiate a need to update and to send a poll message.

The onboard computer may deregister, such that, for example, the sending of poll messages is cancelled when the ancillary subdivision/district is removed from a list of one or more subdivisions/districts. The onboard computer may deregister for an ancillary subdivision/district if the onboard computer transitions out of a controlling state (e.g., active, disengaged, restricted, etc.), an ancillary subdivision/district is removed from the onboard computer (e.g., removed from the ancillary subdivision/district list of the onboard computer, etc.), and/or the like. For example, deregistration may be applied to an ancillary subdivision if the intersecting subdivision that caused the ancillary subdivision to be identified is removed from the vehicle group subdivision list.

The onboard computer may resend a polling request for route data within a threshold amount of time. For example, a threshold amount of time may be determined by onboard computer and/or remote server of the operating vehicle network operator of the ancillary subdivision/district.

At step 1106, the process includes receiving route data for the vehicle network operator associated with the ancillary subdivision/district. For example, in one embodiment, onboard computer receives route data for the vehicle network operator associated with the ancillary subdivision/district. For example, onboard computer obtains and/or is updated with a portion of the route data for at least one vehicle network operator of the one or more vehicle network operators, and the route data includes intersecting subdivision/district identifiers associated with route data of the at least one vehicle network operator having at least one route segment intersecting one or more subdivisions/districts.

The onboard computer receives route data for the vehicle network operator associated with the ancillary subdivision/district based on generating a request for route data for the vehicle network operator associated with the ancillary subdivision/district. The onboard computer may receive a response including a route data version for the ancillary subdivision/district. The onboard computer may validate the response.

The onboard computer may obtain route data associated with the route data version based on receiving a response including a route data version for the ancillary subdivision/district. The onboard computer may update the onboard computer with a portion of route data associated with the ancillary subdivision/district.

The controller or onboard computer may obtain the route data associated with the route data version by determining if the route data is stored locally. The onboard computer may determine the route data is not stored locally, and in response to determining the route data is not stored locally, sending a request for the route data to a back-office system of the vehicle network operator associated with the ancillary subdivision/district. For example, onboard computer sends a request to synchronize all filesets (software, configuration files, and route) with the back-office system, not just a specific route data file. The onboard computer may receive route data for the ancillary subdivision/district from the back-office system of the vehicle network operator associated with the ancillary subdivision/district. The onboard computer may validate the route data based on the request.

At step 1108, the process includes communicating with one or more wayside interface units in the ancillary subdivision/district based on route data. The onboard computer communicates with one or more wayside interface units in the ancillary subdivision/district based on route data.

The onboard computer may receive a local device status table. This table may be used to decode a device status code associated with a wayside device in the ancillary subdivision/district. The device status code may be associated with a wayside device that is monitored by a wayside interface unit. A wayside interface unit may monitor several wayside devices. The device status code may indicate a state of the device (on/off, raised/lowered, etc.) or a health of the device or other information useful for operating vehicles on the route.

The onboard computer receives, stores, determines, and/or communicates a security key for decrypting messages of at least one of wayside device 216*a-d*, 216*e-h*, or wayside interface unit 218*a*. For example, onboard computer receives a security key for decrypting messages to provide an enforcement of mandatory directives, vehicle group control actions, status of signals for vehicle network operators of interlocking subdivision/districts, and any messages for determining route data of an ancillary subdivision/district as described above. In some non-limiting embodiments, a security key is received in route data for decrypting data from an ancillary subdivision, such as a device table of a wayside device, a device table of a wayside interface unit and/or the like. The onboard computer may receive and/or store the security key associated with a wayside interface unit in the ancillary subdivision/district. The security key may be stored separately from the route data. The onboard computer may obtain the security key to decrypt a message received from the wayside interface unit based on a device status of a wayside device in the ancillary subdivision/district. The security key may be unique to communicate with a wayside interface unit that monitors one or more wayside devices. The security key is retrieved and used for establishing secure communication (e.g., one or more secure communications, a secure communication channel, etc.) between a plurality of pairs of actors (e.g., parties, vehicle groups, vehicles, wayside interface units, or any combination).

For purposes of the description herein, the terms "end," "upper," "lower," "right," "left," "vertical," "horizontal," "top," "bottom," "lateral," "longitudinal," and derivatives thereof shall relate to embodiments or aspects as they are oriented in the drawing figures. However, it is to be understood that embodiments or aspects may assume various alternative variations and step sequences, except where expressly specified to the contrary. Specific devices and processes illustrated in the attached drawings, and described in the following specification, are non-limiting exemplary embodiments or aspects. As used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. The terms "has," "have," "having," or the like, are intended to be open-ended terms. As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with, or communicatively coupled to, another unit means that the one unit is able to directly or indirectly receive information from and/or transmit information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments or aspects, a message may refer to a network packet (e.g., a data packet and/or the like) that includes data.

This written description uses examples to disclose the invention and to enable a person of ordinary skill in the relevant art to make and practice the invention, including making and using any devices or systems and performing any incorporated methods. The patentable scope of the invention is defined by the claims. Such other examples are within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application.

What is claimed is:

1. A system comprising:
a controller onboard a vehicle, the controller configured to:
obtain route data associated with one or more subdivisions or districts through or over which the vehicle will travel, each of the one or more subdivisions or district having a corresponding vehicle network operator;
determine that ancillary route data is needed for an ancillary subdivision or district through or over which the vehicle will travel; and
receive the ancillary route data associated with the ancillary subdivision or district at the vehicle responsive to determining that the ancillary route data is needed for the ancillary subdivision or district.

2. The system of claim 1, wherein the controller is further configured to communicate with one or more wayside interface units in the ancillary subdivision or district based at least in part on the ancillary route data.

3. The system of claim 1, wherein the route data comprises a vehicle group identifier assigned by the vehicle network operator for the subdivision or district through or over which the vehicle will operate.

4. The system of claim 1, wherein the ancillary subdivision or district has an ancillary vehicle network operator, and the ancillary route data comprises an ancillary vehicle group identifier assigned by the ancillary vehicle network operator.

5. The system of claim 4, wherein the vehicle group identifier comprises at least one of a vehicle identifier or an ancillary vehicle group identifier assigned by the ancillary vehicle network operator.

6. The system of claim 1, wherein the controller is further configured to send a polling request to a back-office computer of an ancillary vehicle network operator to register a request for poll messages for the ancillary subdivision or district to be sent to the vehicle.

7. The system of claim 6, wherein the controller is further configured to resend the polling request for the ancillary route data within a determined amount of time.

8. The system of claim 6, wherein the poll messages are received periodically at the vehicle, and the poll messages comprise an identifier of at least one of a form-based authority, a bulletin, a speed restriction, or a null list of mandatory directive identifiers.

9. The system of claim 6, wherein the controller is further configured to receive a confirmation of poll registration from the back-office computer.

10. The system of claim 6, wherein the controller is further configured to receive poll messages including a hash over a list of mandatory directive identifiers and a route data version.

11. The system of claim 6, wherein the controller is further configured to validate or verify the route data, the ancillary route data, or both the route data and the ancillary route data.

12. The system of claim 1, wherein the controller is further configured to request an ancillary vehicle group identifier or a validation of an existing vehicle group identifier for the vehicle group to which the vehicle belongs from an ancillary vehicle network operator.

13. The system of claim 1, wherein the controller is configured to receive a bulletin from a back-office server of an ancillary vehicle network operator and is configured to respond by changing a mode of operation of the vehicle.

14. A method, comprising:
obtaining route data associated with one or more subdivision or districts through or over which a vehicle will travel, and each of the one or more subdivisions or districts having a corresponding vehicle network operator;
determining that ancillary route data is needed for an ancillary subdivision or district through or over which the vehicle will travel; and
receiving at the vehicle the ancillary route data associated with the ancillary subdivision or district.

15. The method of claim 14, further comprising sending a polling request to a back-office computer of an ancillary vehicle network operator to register a request for poll messages for the ancillary subdivision or district to be sent to the vehicle.

16. The method of claim 15, further comprising resending the polling request for the ancillary route data within a determined amount of time.

17. The method of claim 15, further comprising receiving the poll messages periodically at the vehicle, and the poll messages comprise an identifier of at least one of a form-based authority, a bulletin, a speed restriction, or a null list of mandatory directive identifiers.

18. The method of claim 15, further comprising receiving a confirmation of poll registration from the back-office computer.

19. The method of claim 15, further comprising validating or verifying an accuracy and correctness of the route data, the ancillary route data, or both.

20. A system for use in a vehicle operation, comprising:
a controller disposed onboard a first vehicle, and the first vehicle is coupled together with second vehicles to form a vehicle group, and the controller is configured to:
obtain route data associated with a subdivision or district of a network of routes through or over which the first vehicle will travel, and the subdivision or district of the network has a corresponding first operator with a corresponding back office, wayside device protocol, and bulletin system;
determine, responsive to a change in a trip plan for the vehicle group, that:
the vehicle group will pass through an ancillary subdivision or district,
ancillary route data is needed for the ancillary subdivision or district through or over which the vehicle group will travel, and
the ancillary route data is not available to the controller in ready memory; and receive, in ready memory at the controller on the first vehicle, the ancillary route data associated with the ancillary subdivision or district from an ancillary operator that is different from the first operator.

\* \* \* \* \*